United States Patent
Babicki et al.

(10) Patent No.: US 7,037,358 B2
(45) Date of Patent: May 2, 2006

(54) PSA WITH ADSORBENTS SENSITIVE TO CONTAMINANTS

(75) Inventors: Matthew L. Babicki, West Vancouver (CA); Bowie G. Keefer, Vancouver (CA); Andrea C. Gibbs, Burnaby (CA); Alberto I. IaCava, Easton, PA (US); Frank Fitch, Bedminster, NJ (US)

(73) Assignees: The BOC Group, Inc., New Providence, NJ (US); QuestAir Technologies Inc., Burnaby (CA)

(*) Notice: Subject to any disclaimer, the term of this patent is extended or adjusted under 35 U.S.C. 154(b) by 0 days.

(21) Appl. No.: 10/021,751

(22) Filed: Dec. 11, 2001

(65) Prior Publication Data

US 2002/0134246 A1 Sep. 26, 2002

(30) Foreign Application Priority Data

Dec. 11, 2000 (CA) .............................. 2329475

(51) Int. Cl.
*B01D 53/047* (2006.01)

(52) U.S. Cl. ................... 95/96; 95/98; 95/113; 95/126

(58) Field of Classification Search ........ 95/90, 95/95, 96, 97, 98, 99, 102, 113, 117, 118, 95/119, 120, 121, 122, 123, 126, 148; 96/132
See application file for complete search history.

(56) References Cited

U.S. PATENT DOCUMENTS

| | | | |
|---|---|---|---|
| 3,094,569 A | 6/1963 | Thomas | |
| 3,204,388 A | 9/1965 | Asker | |
| 3,430,418 A | 3/1969 | Wagner | |
| 3,513,631 A | 5/1970 | Seibert et al. | |
| 3,594,984 A | * 7/1971 | Toyama et al. | 95/126 |
| 3,847,672 A | 11/1974 | Trocciola et al. | |
| 4,019,879 A | 4/1977 | Rabo et al. | |
| 4,127,395 A | * 11/1978 | McKey et al. | 95/10 |
| 4,144,037 A | 3/1979 | Armond et al. | |
| 4,153,434 A | 5/1979 | Settlemyer | |
| 4,200,682 A | 4/1980 | Sederquist | |
| 4,272,265 A | 6/1981 | Snyder | |
| 4,322,394 A | 3/1982 | Mezey et al. | |
| 4,354,859 A | 10/1982 | Keller et al. | |
| 4,406,675 A | * 9/1983 | Dangieri et al. | 95/26 |
| 4,452,612 A | * 6/1984 | Mattia | 95/100 |
| 4,530,705 A | 7/1985 | Firey | |
| 4,539,019 A | * 9/1985 | Koch | 95/19 |
| 4,555,453 A | 11/1985 | Appleby | |
| 4,578,214 A | 3/1986 | Jungerhans | |
| 4,587,114 A | 5/1986 | Hirai et al. | |
| 4,595,642 A | 6/1986 | Nakanishi et al. | |
| 4,702,903 A | 10/1987 | Keefer | |
| 4,726,816 A | 2/1988 | Fuderer | |
| 4,743,276 A | 5/1988 | Nishida et al. | |
| 4,756,723 A | * 7/1988 | Sircar | 95/103 |
| 4,758,253 A | 7/1988 | Davidson et al. | |
| 4,759,997 A | 7/1988 | Ohyauchi et al. | |
| 4,781,735 A | 11/1988 | Tagawa | |
| 4,783,433 A | 11/1988 | Tajima et al. | |
| 4,790,858 A | 12/1988 | Sircar | |
| 4,801,308 A | 1/1989 | Keefer | |
| 4,816,121 A | 3/1989 | Keefer | |
| 4,914,076 A | 4/1990 | Tsuji et al. | |
| 4,917,711 A | 4/1990 | Xie et al. | |
| 4,950,311 A | * 8/1990 | White, Jr. | 95/98 |
| 4,963,339 A | 10/1990 | Krishnamurthy et al. | |
| 4,968,329 A | 11/1990 | Keefer et al. | |
| 4,969,935 A | 11/1990 | Hay | |
| 4,988,580 A | 1/1991 | Ohsaki et al. | |
| 5,079,103 A | 1/1992 | Schramm | |
| 5,082,473 A | 1/1992 | Keefer | |
| 5,096,469 A | 3/1992 | Keefer | |
| 5,096,470 A | 3/1992 | Krishnamurthy | |
| 5,126,310 A | 6/1992 | Golden et al. | |
| 5,133,784 A | 7/1992 | Boudet et al. | |
| 5,175,061 A | 12/1992 | Hildebrandt et al. | |
| 5,227,598 A | 7/1993 | Woodmansee et al. | |
| 5,246,676 A | 9/1993 | Hay | |
| 5,248,325 A | 9/1993 | Kagimoto et al. | |
| 5,256,172 A | 10/1993 | Keefer | |
| 5,256,174 A | 10/1993 | Kai et al. | |
| 5,258,571 A | 11/1993 | Golden et al. | |

| | | |
|---|---|---|
| 5,271,916 A | 12/1993 | Vanderborgh et al. |
| 5,282,886 A | 2/1994 | Kobayashi et al. |
| 5,328,503 A | 7/1994 | Kumar |
| 5,366,818 A | 11/1994 | Wilkinson et al. |
| 5,393,326 A | 2/1995 | Engler et al. |
| 5,411,578 A | 5/1995 | Watson |
| 5,415,748 A | 5/1995 | Emiliani et al. |
| 5,429,665 A | 7/1995 | Botich |
| 5,431,716 A | 7/1995 | Ebbeson |
| 5,434,016 A | 7/1995 | Benz et al. |
| 5,441,559 A | 8/1995 | Petit et al. |
| 5,443,623 A * | 8/1995 | Jonas et al. ............... 95/101 |
| 5,487,775 A | 1/1996 | LaCava et al. |
| 5,507,957 A * | 4/1996 | Garrett et al. ............. 210/760 |
| 5,509,956 A | 4/1996 | Opperman et al. |
| 5,523,326 A | 6/1996 | Dandekar et al. |
| 5,531,809 A | 7/1996 | Golden et al. |
| 5,543,238 A | 8/1996 | Strasser |
| 5,593,478 A | 1/1997 | Hill et al. |
| 5,604,047 A | 2/1997 | Bellows et al. |
| 5,645,950 A | 7/1997 | Benz et al. |
| 5,656,067 A | 8/1997 | Watson et al. |
| 5,658,370 A | 8/1997 | Vigor et al. |
| 5,711,926 A | 1/1998 | Knaebel |
| 5,714,276 A | 2/1998 | Okamoto |
| 5,766,311 A | 6/1998 | Ackley et al. |
| 5,811,201 A | 9/1998 | Skowronski |
| 5,827,358 A | 10/1998 | Kulish et al. |
| 5,900,329 A | 5/1999 | Reiter et al. |
| 5,917,136 A | 6/1999 | Gaffney et al. |
| 5,925,322 A | 7/1999 | Werth |
| 5,955,039 A | 9/1999 | Dowdy |
| 5,981,096 A | 11/1999 | Horburg et al. |
| 6,022,399 A | 2/2000 | Ertl et al. |
| 6,045,933 A | 4/2000 | Okamoto |
| 6,051,050 A | 4/2000 | Keefer et al. |
| 6,056,804 A | 5/2000 | Keefer et al. |
| 6,060,032 A | 5/2000 | Hable et al. |
| 6,063,161 A | 5/2000 | Keefer et al. |
| 6,143,057 A | 11/2000 | Bülow et al. |
| 6,176,897 B1 | 1/2001 | Keefer |
| 6,190,623 B1 | 2/2001 | Sanger et al. |
| 6,190,791 B1 | 2/2001 | Hornburg |
| 6,200,365 B1 | 3/2001 | Eimer et al. |
| 6,231,644 B1 | 5/2001 | Jain et al. |
| 6,283,723 B1 | 9/2001 | Milburn et al. |
| 6,293,998 B1 | 9/2001 | Dolan et al. |
| 6,296,823 B1 | 10/2001 | Ertl et al. |
| 6,312,843 B1 | 11/2001 | Kimbara et al. |
| 6,398,853 B1 | 6/2002 | Keefer et al. |
| 6,406,523 B1 | 6/2002 | Connor et al. |
| 6,514,319 B1 * | 2/2003 | Keefer et al. ............... 95/101 |
| 2002/0004157 A1 | 1/2002 | Keefer et al. |
| 2002/0098394 A1 | 7/2002 | Keefer et al. |

FOREIGN PATENT DOCUMENTS

| | | |
|---|---|---|
| CA | 1256038 | 6/1989 |
| CA | 2016045 | 8/1994 |
| CA | 2087972 | 1/2000 |
| CA | 2109055 | 2/2000 |
| CA | 2087973 | 1/2001 |
| DE | 3913581 A1 | 11/1990 |
| EP | 0 341 189 A1 | 8/1989 |
| EP | 0 143 537 A2 | 3/1990 |
| EP | 0 143 537 B1 | 3/1990 |
| EP | 0 681 860 A2 | 7/1996 |
| EP | 0 691 701 A1 | 10/1996 |
| EP | 0 750 361 A | 12/1996 |
| EP | 1 070 531 A2 | 1/2001 |
| EP | 1095689 A1 | 5/2001 |
| GB | 2 042 365 | 9/1980 |
| JP | 59075574 A | 4/1984 |
| JP | 07094200 | 7/1995 |
| JP | 8045526 A2 | 2/1996 |
| JP | 10325360 A | 12/1998 |
| JP | 11214021 A2 | 8/1999 |
| WO | WO 94/04249 | 8/1992 |
| WO | WO 9829182 | 9/1998 |
| WO | WO 99/28013 | 6/1999 |
| WO | WO 99/46032 | 9/1999 |
| WO | WO 00/16425 | 3/2000 |
| WO | WO 00/16880 | 3/2000 |

OTHER PUBLICATIONS

Vaporciyan and Kadiec, "Periodic Separating Reactors: Experiments and Theory," *AIChE Journal* 35, pp. 831–844 (1989).

Chatsiriwech et al., "Enhancement of Catalytic Reaction by Pressure Swing Adsorption," *Catalysis Today* 20, Elsevier Science, pp. 351–366 (1994).

Hufton et al., "Sorption Enhanced Reaction Process for Hydrogen Production," *AIChE Journal*, vol. 45 No. 2, 248–256 (Feb. 1999).

International Search Report for PCT Application No. US01/48569 (Apr. 5, 2002).

* cited by examiner

*Primary Examiner*—Frank M. Lawrence
(74) *Attorney, Agent, or Firm*—Klarquist Sparkman, LLP

(57) ABSTRACT

Disclosed embodiments address contaminant management challenges that arise during production of desirably contaminant free product fluid in the operation of PSA equipment, and further address the more serious challenges that arise under intermittent operation of PSA equipment. One disclosed embodiment of a PSA apparatus, intended primarily for normal operating cycle speeds of at least 3 cycles per minute, includes a breather fluidly coupled to a feed end of an adsorber with a contaminant-sensitive adsorbent. The breather can be coupled to the feed end through a shutoff valve closed during production and open during shutdown. Other disclosed embodiments of the PSA apparatus used particular sealing strategies for additional sealing of the apparatus, or at least components thereof, from contaminant ingress. For example, one embodiment comprises a buffer seal for receiving a buffer gas having a contaminant vapor content substantially the same as or less than a product gas produced by a pressure swing adsorption process over the adsorbers. The buffer chamber may have flushing circulation provided by delivered product flow. As a second example of sealing strategy, a parking seal can be used that typically is engaged when the apparatus is parked. The parking seal can be used alone, or in combination with other contaminant management features. Embodiments of a method for reducing adsorbent degradation by contaminant adsorption while producing a product gas also are described comprising providing described embodiments of the PSA apparatus or system, and operating such PSA apparatus or system to produce a product gas. Various embodiments for operating a PSA apparatus and system during normal product delivery, shutdown, park and start up modes also are described.

120 Claims, 27 Drawing Sheets

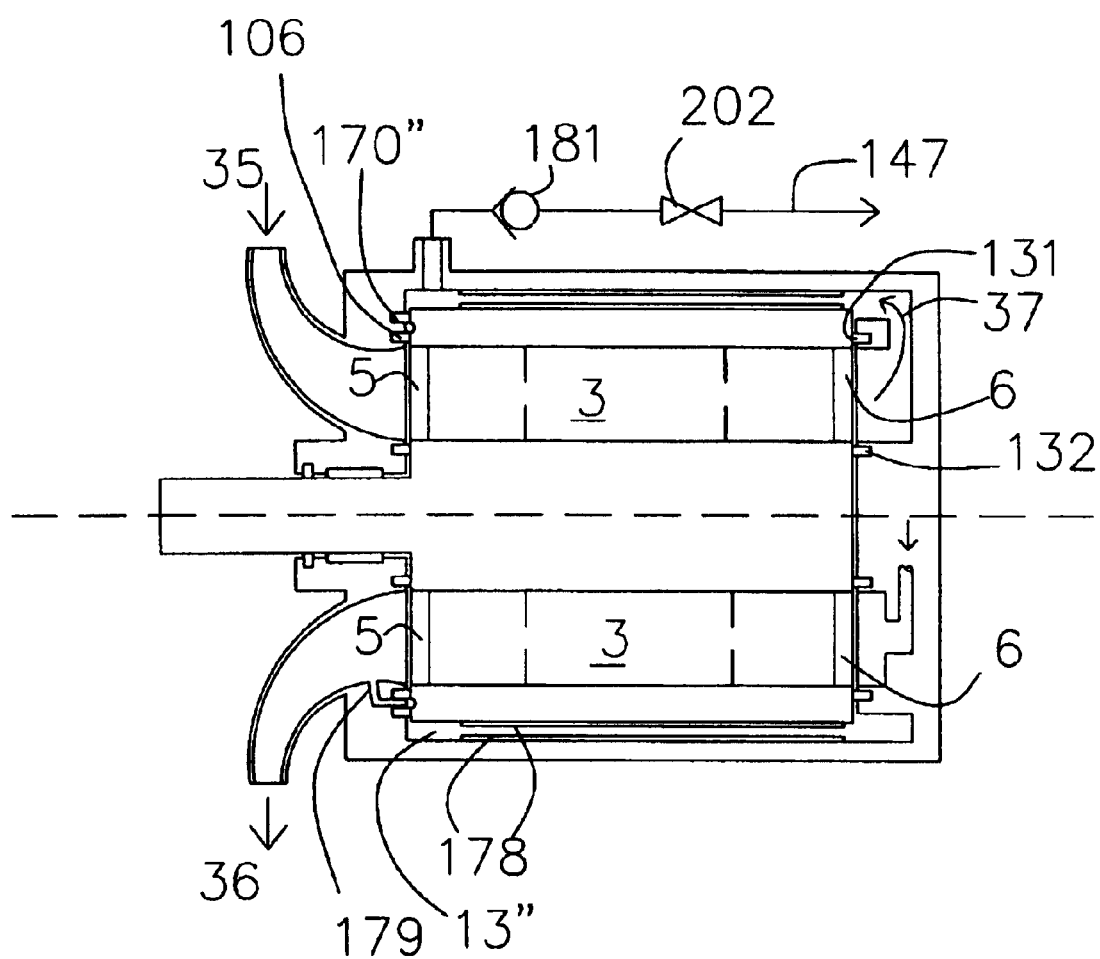

PSA WITH ADSORBENTS SENSITIVE TO CONTAMINANTS

CROSS REFERENCE TO RELATED APPLICATION

The present application claims priority from pending Canadian application No. 2,329,475, filed on Dec. 11, 2000, which is incorporated herein by reference.

FIELD

The disclosed embodiments concern gas separation using adsorbents sensitive to contaminant deactivation, such as deactivation by atmospheric humidity. More specifically, the disclosed embodiments concern a cyclic adsorption process, e.g., vacuum swing adsorption (VSA) or pressure swing adsorption (PSA) carried out in a system comprising at least one adsorber containing adsorbent, such as in the form of laminated sheets or other parallel passage support. One exemplary PSA embodiment is oxygen enrichment of air using nitrogen-selective adsorbents, which are hydrophilic in their activated condition.

BACKGROUND

Gas separation by pressure swing adsorption is achieved by synchronized pressure cycling and flow reversals over an adsorber that preferentially adsorbs a more readily adsorbed component relative to a less readily adsorbed component of the feed gas mixture. The total pressure is elevated during intervals of flow in a first direction through the adsorber from a first end (feed end) to a second end of the adsorber (product end), and is reduced during intervals of flow in the reverse direction. As the cycle is repeated, the less readily adsorbed component is concentrated in the first direction, while the more readily adsorbed component is concentrated in the reverse direction.

A "light" product, depleted in at least one more readily adsorbed component and enriched in at least one less readily adsorbed component, is then delivered from the second end of the adsorber. A "heavy" product enriched in the more strongly adsorbed component is exhausted from the first end of the adsorber. The light product is usually the desired product to be purified, and the heavy product often a waste product, as in the important examples of oxygen separation over nitrogen-selective zeolite adsorbents and hydrogen purification. The heavy product may be a desired product, as in the example of nitrogen separation over nitrogen-selective zeolite adsorbents. Typically, a feed fluid is admitted to the first end of an adsorber and light product is delivered from the second end of the adsorber when the pressure in that adsorber is elevated to a higher working pressure. Heavy product is exhausted from the first end of the adsorber at a lower working pressure. In order to achieve a higher purity light product, a fraction of the light product or gas enriched in the less readily adsorbed component is recycled back to the adsorbers as "light reflux" gas after pressure letdown, e.g. to perform purge, pressure equalization or repressurization steps.

The primary function of the PSA process is to separate at least one preferentially adsorbed component such as nitrogen from at least one less readily adsorbed component such as oxygen, usually to concentrate the oxygen as the desired product from air as the feed mixture. The present invention is concerned with problems caused by other, even more preferentially adsorbed components in the process gases or in the surrounding atmosphere, such as ambient water vapor or another vapor contaminant, whose very strong and sometimes almost irreversible adsorption may deactivate or poison the adsorbent to degrade its capacity and selectivity for the primary separation function.

There are numerous commercial processes using the above adsorptive phenomena, with a multitude of pressure envelopes. In VSA processes, the adsorbent is at least partially regenerated at a sub-atmospheric pressure, while in many PSA processes, the adsorbent is regenerated at close to atmospheric pressure. Many processes also regenerate the adsorbent at substantially higher than atmospheric pressures. The different PSA processes are not differentiated herein unless explicitly stated otherwise. "PSA" means that the adsorption step is carried out at a pressure higher than the desorption or regeneration pressure.

Many process improvements have been made to this simple cycle design in order to reduce power consumption, improve product recovery and purity, and increase product flow rate. These have included multi-bed processes, single-column rapid pressure swing adsorption and, more recently, piston-driven, rapid pressure swing adsorption and rotationally valved PSA (rotary PSA). Cycle frequency with conventional valves and granular adsorbents cannot be greatly increased, so adsorbent inventory is large. The trend toward shorter cycle times is driven by the desire to design more compact processes with lower capital costs, lower power requirements and more compact and lighter equipment.

PSA processes and apparatuses using at least one multi-port, multi-fluid distribution valve, often with components relatively rotating, are defined herein as rotary PSA. These apparatuses require dynamic sealing surfaces, some of which define the boundaries of process gas system containment and sometimes the ambient surroundings. Because of the relative motion of the moving surfaces, a tight fluid seal is not practicable, and some mass flow of components in the surrounding ambient gas or other process gas into the light gas is possible, even if there are pressure gradients opposing these mass flows across the dynamic seals.

Most commercial adsorption processes currently employ fixed-bed adsorbents usually in the form of beads or pellets. Typically, these beads or pellets range in size from about 1.5 mm to 4 mm.

Parallel passage extrudate monoliths of zeolite adsorbent for PSA air separation devices are disclosed in U.S. Pat. No. 4,758,253 (Davidson et al). U.S. Pat. Nos. 4,968,329 and 5,082,473 (Keefer), and U.S. Pat. No. 6,231,644 (Jain et al., which is incorporated herein by reference) disclose spirally rolled adsorbent sheets of 1 mm or less thickness for use in a layered structure (either laminate or monolithic) for use in PSA devices to achieve higher frequency operation from the conventional 45 seconds cycle period, in the range of less than 0.5 seconds to about 5 seconds cycle period, while preserving a low pressure drop and low power consumption. High-surface-area, laminated adsorbers, having adsorbent supported in thin sheets separated by spacers to define flow channels between adjacent sheets, and with the adsorbers mounted in a rotor to provide the PSA process valve logic with only one moving part, facilitate a high frequency PSA cycle that can be performed in an extremely compact apparatus as disclosed by Keefer et al., U.S. Pat. No. 6,051,050, and Keefer et al.'s U.S. patent application Ser. No. 60/285,527, the disclosures of which are incorporated herein by reference.

As used herein, fast cycle PSA or high frequency PSA or high speed PSA refers to PSA processes and apparatuses that operate with less than about one-minute total cycle periods. Non-conventional PSA refers to either fast cycle PSA, rotary PSA or both.

One factor is the greater sensitivity of high performance adsorbents to contaminants. The use of low silica-to-alumina ratio zeolites (exchanged with cations such as calcium or lithium that provide high selectivity to nitrogen) for oxygen production may contribute to create a more sensitive material towards water deactivation since such zeolites tend to adsorb water more strongly on some of the active sites.

Traditional PSA and membrane separation units tend to use diverse methods of removing water, such as cooling followed by condensation, membrane separation or adsorption. Adsorption processes for water removal are very common in PSA or VSA processes where two main components have to be separated and there is a few percent of humidity in the gaseous mixture.

The patent literature has examples of complex processes to remove water. Toyama et al. in U.S. Pat. No. 3,594,984 (1971) disclose a system where water and carbon dioxide are removed in separate vessels and purified air is then fed to vessels packed with adsorbent that preferentially adsorbs nitrogen. Smith et al. in GB 2 042 365 (1980) and Armond et al. in U.S. Pat. No. 4,144,037 (1979) use a dual layer system in each PSA vessel. The first layer is a desiccant adsorbent. The second layer preferentially adsorbs the less desired component of the mixture. This concept of a dual layer is quite popular since it avoids the cost of extra vessels, valves and piping required in more complex approaches.

Another approach frequently used is to have a single layer of adsorbent (e.g. a zeolite). The first part of the zeolite bed acts as a desiccant bed for the rest of the zeolite bed. This concept has been used successfully in low frequency PSA in reasonably large scale plants (40 ton per day).

It also has been recognized that humidity leakage into the product end of the adsorbers may be minimized by careful design of valve stem or rotor sealing arrangements to isolate interior flow passages communicating with the product end of the adsorbers from the external environment. Thus, Keefer et al. in U.S. Pat. No. 6,063,161 disclose multiple seals on the rotor and shaft of a product-end rotary distributor valve, with the product gas delivered through a chamber between those seals. Similar product end sealing arrangements for rotary PSA devices also are shown by Keefer et al. in International Publication WO 99/28013. Monereau et al. (EP 1,095,689 A1) also have disclosed improved valve stem sealing arrangements to prevent humidity ingress into the product end of PSA adsorbers.

All methods for protecting zeolite against humidity described above work quite well within the life of the plant. If the methods are inadequate for protecting the adsorbent separation layer beyond the life of the plant, this is not important for the conventional cases.

Industrial PSA and VPSA systems operate at low cycle frequency (with cycle times for typical processes ranging from about 1 minute to 10 minutes) using large inventories of adsorbent. These industrial processes are relatively insensitive to minor contamination by contaminants because: (1) the relatively large dimension of the adsorbers across which contaminant diffusion may occur; (2) the slow rate of any deterioration dependant on the cumulative number of cycles experienced; (3) the relative insensitivity to deactivation of a small fraction of a large adsorbent inventory; and (4) the relatively tight fluid sealing of static seals keeping the process gas from external ambient or feed gas conditions. Hence, a conventional system may operate for many years with no noticeable degradation.

Non-conventional PSA systems have been developed with operating frequencies up to two orders of magnitude faster than conventional industrial PSA processes. Consequently the adsorbent inventory is smaller by approximately the same factor of up to two orders of magnitude, and the dimension of the adsorbers across which contaminant diffusion may take place is also reduced by a large factor.

SUMMARY

The inventors have determined solutions for contaminant management challenges that arise in the operation of non-conventional PSA equipment in normal continuous operation, and have further addressed the challenges that arise under intermittent operation of the PSA equipment. When a PSA unit is parked, any adsorbed contaminant in any part of the adsorber may diffuse detrimentally into zones of activated adsorbent to cause deactivation or poisoning. Furthermore, normal fluctuations of ambient temperature and barometric pressure may cause a parked PSA unit to take in contaminants mixed in the surrounding atmosphere or in the feed gas conduit. Hence, the invention also addresses shutdown and start up procedures and supplementary devices for excluding or minimizing contaminant ingress into a non-conventional PSA unit when it is stored, idled, or parked.

The discovery of the high sensitivity of the high frequency PSA/VSA towards humidity was first made experimentally. As high frequency processes tend to have small inventories of adsorbent in proportion to the gas to be separated, their adsorbent is more likely to suffer from poisoning or deactivation for the same level of impurities. Considering that conventional processes for $O_2$ production by VSA (for example) run between 90 and 120 second cycle time and high frequency process can run typically to 1 second cycle time, the proportion of gas per unit mass is about 100-times higher for the high frequency adsorbent. Less volume mass of deactivating humidity is required to reduce the performance of the smaller amount of adsorbent.

In order to overcome mass transfer constraints, high frequency PSA adsorbers must have a high surface area, hence thin adsorbent layers and narrow hydraulic radius of flow channels. With narrow flow channels, it is necessary to reduce the length of the flow channels in order to maintain desirably low pressure drop. Vulnerability of the high frequency adsorber to deactivation is greatly exacerbated by short adsorber length, since the time scale for humidity transport by diffusive transport relates inversely to the square of adsorber length.

Embodiments of the present invention address contaminant management challenges that arise during production of desirably contaminant-free product fluid in the operation of PSA equipment, particularly nonconventional, fast cycle PSA equipment. Embodiments of the disclosed invention further address the more serious challenges that arise under intermittent operation of PSA equipment under diverse climatic conditions of ambient temperature and humidity. When a PSA unit is shutdown, any adsorbed contaminant in any part of the adsorber may diffuse detrimentally into contaminant-sensitive zones of activated adsorbent to cause deactivation. Furthermore, normal fluctuations of ambient temperature and barometric pressure may cause an idled PSA unit to take in contaminant laden air through any breather port or through leakage paths in imperfectly closed valves, seals, and compression machinery. Hence, the disclosed embodiments also address contaminant-safe start up, normal production operation, shutdown and parking procedures. Supplementary devices for excluding or minimizing contaminant ingress into a fast cycle PSA unit when it is in a storage, idled or "parked" condition, also are described.

Disclosed embodiments of a PSA apparatus are intended primarily for normal operating cycle frequencies of at least 3 cycles per minute, more likely 5 cycles per minute, even more likely 10 cycles per minute, and preferably 20 cycles per minute or more. One disclosed embodiment of such a PSA apparatus, includes a breather fluidly coupled to a feed end of an adsorber with a contaminant-sensitive adsorbent. The breather can be coupled to the feed end through a shutoff valve closed during production and open during shutdown.

Other disclosed embodiments of the PSA apparatus used particular sealing strategies for additional sealing of the apparatus, or at least components thereof, from contaminant ingress. For example, one embodiment comprises a product end fluidly coupled to a product delivery compartment having a buffer seal, with the compartment receiving a buffer gas having a contaminant vapor content substantially the same as or less than a product gas produced by a pressure swing adsorption process over the adsorbers. For embodiments using a buffer seal, the buffer space may be a positive-pressured, dry-fluid-flushed zone. For example, the buffer chamber may have flushing circulation provided by delivered product flow, with this circulation directed countercurrently to the direction by which any incoming contaminant might diffuse from the buffer seal. The compartment can be pressurized to a pressure above ambient with the buffer gas, such as to a pressure of about 0.5 bar or more above ambient.

As a second example of sealing strategy, a parking seal can be used. A parking seal typically is engaged when the apparatus is parked. The parking seal can be used alone, or in combination with other contaminant management features.

By way of exemplifying combinations of disclosed features, the breather may include a guard trap, or may be fluidly coupled to an auxiliary guard trap. Breathers can have a variety of structures, but typically have a relatively long structural compartment, such as a tubular construction, or an inflated bag diaphragm. Breathers may be coupled to the feed end of the adsorbers by a feed plenum. Both feed and exhaust plenums can be used, and where both are used, layered plenums, such as plenums positioned concentrically about a rotary axis and layered one on top of another, can be used.

Embodiments also include adsorbers comprising a guard layer and an adsorbent, such as where the adsorbers comprise laminates having a guard layer in a first zone along a fluid feed path and an adsorbent in a second zone along the feed path. Contaminant in the feed fluid is thus removed by the guard layer, prior to contacting the adsorbent. Moreover, the guard layer can be isolated on shutdown from the adsorbent zone by an isolation valve, such as a shut off valve, in line between the guard layer and the adsorbent zone. One example is to house guard material in a first module separate from, but fluidly coupled to, a second module housing the adsorbent. The first and second modules are fluidly coupled through an isolation valve in a fluid conduit coupling the first module and the second module.

The described embodiment of the apparatus may further include a product delivery conduit for delivering a desired product gas, a light reflux conduit for delivering a portion of product gas as reflux gas, and at least one trap comprising a guard material for trapping a contaminant. Such traps can be rotated between the product reflux lines and the product line for displacement purged regeneration by the product fluid. For example, plural guard traps can be mounted within a rotary adsorption module that rotates continuously at a low rotary speed. The rotary adsorption module rotates through discrete fractional rotations at discrete intervals to switch guard traps from contaminant adsorption from each of several product reflux loops to regeneration when fluidly coupled to product delivery.

Auxiliary guard traps have been used with various embodiments. Such auxiliary guard traps can be fluidly coupled to a product gas delivery conduit so that the auxiliary guard trap is regenerated during normal operation. Regeneration of the guard materials can be accomplished using at least one of a dry product purge or thermal swing. Substantially complete regeneration of the adsorbers' guard layer can be accomplished using a displacement purge to transfer adsorbed contaminant from a contaminant adsorption zone of an adsorber to the auxiliary guard trap. As a result, the auxiliary guard trap preferably has a contaminant vapor capacity sufficient to adsorb substantially all the contaminant vapor possibly desorbed from the adsorbers' guard layer or layers. A sensor, such as a humidity sensor, can be used for sensing contaminant vapor back flowing from the auxiliary guard trap, in which situation the auxiliary guard trap could be isolated from the adsorbers.

Heating guard material using auxiliary heaters can facilitate contaminant desorption. For example, a heater can be used to heat the first guard layer, any auxiliary guard traps, guard traps used in a breather, etc. Conventional heaters, as well as microwave and infrared radiation, can be used to heat the guard material.

Isolation valves often are used alone, or in combination with other contaminant management features. Isolation valves are used with several embodiments to isolate certain contaminant sensitive zones comprising adsorbent from guard layers. Isolation valves can be check valves to prevent forward flow from the first guard layer of an adsorber to a second adsorbent zone except during normal operation of the PSA module. The check valve can be actuated by an actuator as required. An isolation valve also can be placed in a fluid path between the breather conduit and the absorbers to prevent flow to the feed ends of the adsorbers.

Embodiments of a method for reducing adsorbent degradation by contaminant adsorption while producing a product gas also are described comprising providing described embodiments of the PSA apparatus or system, and operating such PSA apparatus or system to produce a product gas. Various embodiments for operating a PSA apparatus and system during normal product delivery, shutdown, park and start up modes also are described. For example, one embodiment for shutting down a PSA apparatus according to a shutdown sequence included the following features. Product delivery is stopped, while feed gas continues to flow through the PSA process so as to push the contaminant front partially backward toward the feed end of the adsorbers. A blanket gas is introduced into a feed end of the PSA apparatus, and guard material is heated to facilitate desorption of adsorbed contaminant. Delivery of fluid feed mixture to the feed end is then stopped, followed by purging the adsorbers with a purge fluid having a contaminant vapor content substantially equal or less than the contaminant vapor content of the product gas produced by a PSA process over the adsorbers. The purge gas often is the product gas produced by a PSA process over the adsorbers. And, the dry product purge gas may be recirculated through an auxiliary guard trap prior to purging the adsorbers. The purge fluid may be used at a temperature higher than the adsorbers. Purging the adsorbers with the adsorber purge fluid heats the adsorbers, and thereby facilitates contaminant desorption. All purge operations are stopped, and an exhaust port is closed. A second blanket gas, which may be the same as or different from the first blanket gas, is then fed to the feed end to pressurize the apparatus to a pressure above ambient. Rotation of the apparatus is stopped, and any parking seal is then engaged. Different steps, additional steps, various combinations of these steps, and different sequences of such steps, can be used in the method.

A method for increasing useful operation time, particularly fast cycle rotary PSA apparatuses also is described. Embodiments of the method included providing a PSA unit having a guard trap upstream of a feed end of the PSA unit, and adsorbers having a guard layer at the feed end of the adsorbers. The PSA unit is operated under normal operating conditions to produce a product fluid. The adsorbers preferably are provided as high-surface-area, laminated adsorbers, with the adsorbent supported in thin adsorbent sheets separated by spacers to define flow channels between adjacent sheets. For such embodiments, the laminated adsorbers typically include a guard layer having at least one guard material at the feed end of the adsorbent sheets. The guard material may be selected from the group consisting of useful guard materials, including alumina, silica gel and moderately hydrophilic zeolites such as Na—Y or Na—X.

For certain embodiments, the contaminant is water and the target water vapor pressure at the product end is substantially that of the selected adsorbent material at the product end. This water vapor pressure typically ranges from about 0.005 Pa to about 0.1 Pa at 30° C.

An embodiment of the described method useful for producing a positive pressure park mode in a rotary PSA apparatus also is described. The embodiment comprised shutting down a rotating PSA apparatus to reduce loading of guard material with contaminant. A light, dry blanket gas is introduced into a feed end of the apparatus to provide a park pressure above ambient. All ports are closed, the rotor's rotation is stopped, and a parking seal is engaged.

BRIEF DESCRIPTION OF THE DRAWINGS

FIG. 1A is another embodiment of a rotary, axial flow PSA module.

DETAILED DESCRIPTION

I. Definitions

Figure 1:
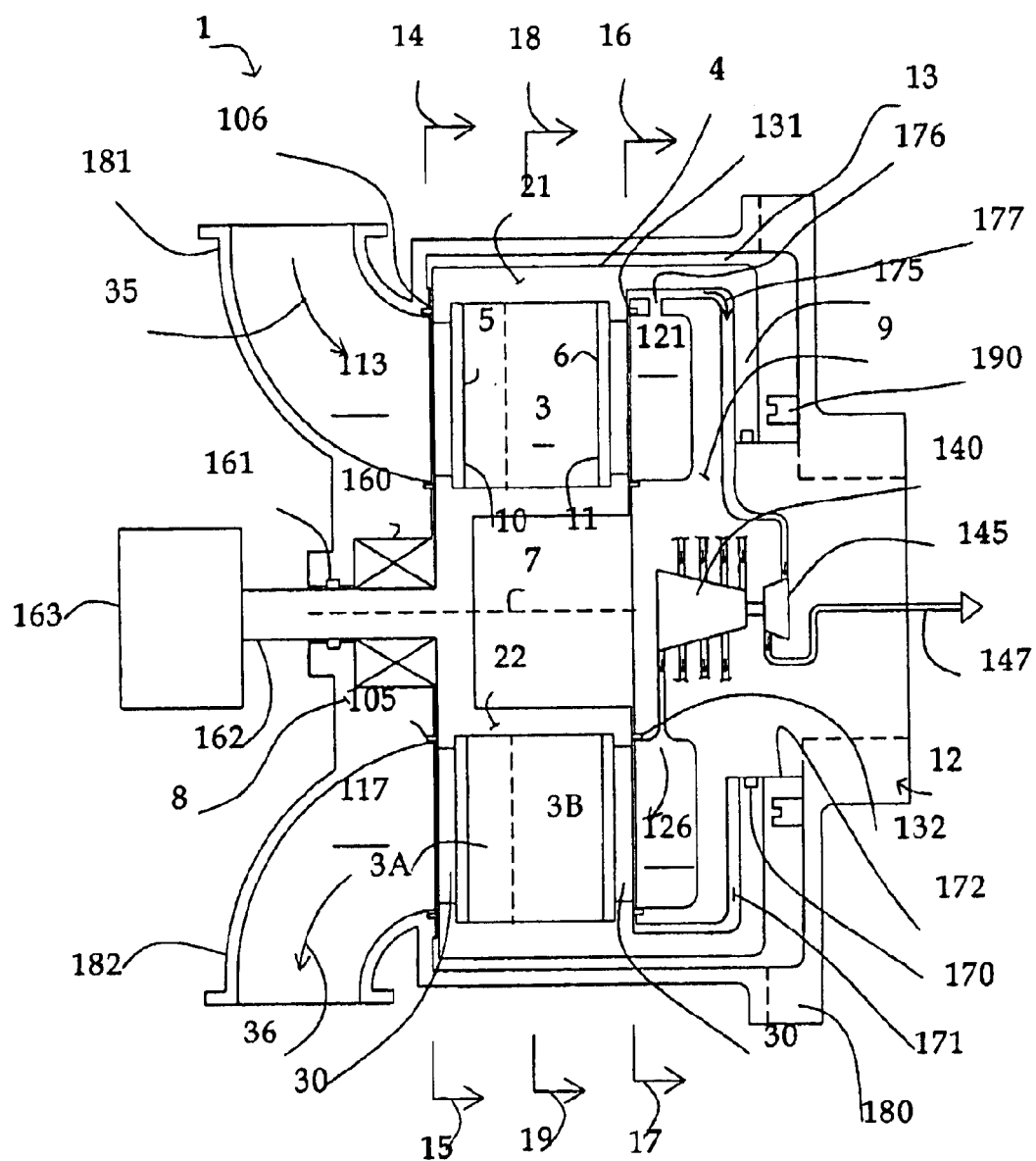
FIG. 1 is a schematic cross sectional view of a rotary, axial flow PSA module.

The following definitions are provided to aid the reader and are not intended to limit the defined terms to a scope less than would be understood by a person of ordinary skill in the art.

"Adsorber Material"—generally refers to materials which can be used alone or in combinations, to preferentially adsorb a fluid. To perform a PSA separation function the adsorber materials should have preferential adsorption properties.

"Auxiliary heating"—guard materials, such as desiccants in an adsorber, air breather or in a guard trap, can be heated to increase contaminate desorption. Any useful heating source can be used to heat the guard material directly including, without limitation, auxiliary resistance heaters, microwave radiation heaters, infrared radiation heaters, seal friction, etc. Guard material also can be heated indirectly, including, with out limitation, methods such as heating fluids that enter the guard material through vacuum pump or compressor work on the fluids, through manipulation of heat exchangers, through heat of adsorption on a guard trap, etc.

"Back Purge"—is a process of feeding a gas, such as a product, purge or blanket gas, countercurrently through a body, such as an adsorber.

"Blanket Fluid"—a fluid with substantially reduced contaminant content. The blanket fluids are used to displace process or purge or other fluids in the adsorbers and their associated conduits, and/or to create a total pressure in the adsorbers higher than the normal operation low pressure.

"Breather"—a chamber, such as a relatively long tube or bladder, with or without a guard trap, useful to retard contaminant ingress into adsorbers while parked and while keeping the adsorbers in pressure equilibrium with an external fluid. Breathers, particularly air breathers (breathers that communicate with external air), significantly decrease the rate of deactivation or poisoning of adsorbents by contaminant ingress during thermal cycling. For example, for a particular zeolite, the deactivation rate for a bed with an air breather was about 0.005% $N_2$ capacity decrease per cycle compared to 0.135% $N_2$ capacity decrease per cycle for the same adsorber and zeolite used without an air breather. Breathers can be placed at either end of the adsorbers or even at both ends. Without being limited to one theory of operation, air breathers apparently reduce mass flow of contaminants from contaminant-laden air to the feed end of the adsorbent beds while a PSA apparatus is parked.

"Buffer Chamber"—a buffer chamber is the volume bounded by two immediately adjacent dynamic seals in a buffer space. There can be one or more buffer chambers within a buffer space, depending on the number of buffer seals within the buffer space. There also can be one or more parking seals within a buffer chamber, as well as means for fluid flow into and out of the chamber. A static buffer chamber is defined by the volume between a dynamic seal and a static seal.

"Buffer Seal"—a buffer seal is a dynamic seal, located in the buffer space. There can be multiple buffer seals in a buffer space.

"Buffer Space"—a space bounded by process containment seal and a primary seal. The buffer space can have any number of buffer seals within the space, including no buffer seals.

"Contaminant"—Contaminant fluids, without limitation, are those fluids in either the surrounding atmosphere, the PSA apparatus or in the feed gas mixture that inhibit the adsorption/desorption process of all the intended more strongly adsorbed components of the feed gas at the second end of any of the adsorbers. Particular attention is paid to gases, which will not desorb from the adsorbent at the designed regeneration pressure, in the designed time of this portion of the cycle. The most common contaminant is water, as it is often present in both the feed gas mixture and in the surrounding atmosphere. Other examples of contaminants include hydrocarbons, and hydrogen sulphide gas. Where the contaminant is a component of the air, a PSA unit may be used as an apparatus to decontaminate the breathing air for personnel. As another example, the carbon dioxide content in dry air has been found experimentally to contaminate the adsorbent of a laboratory oxygen PSA apparatus whose design did not incorporate disclosed embodiments of the present invention. Significant reversible degradation resulted from carbon dioxide remaining in air, from which humidity had been externally removed sufficiently to avoid humidity degradation of the nitrogen-selective adsorbent. The contaminant concentration should be at a level that allows the adsorbent to function for its intended purpose for a useful life. The definition of contaminant can depend on the adsorbent, the process, the process temperature, ambient temperature or both and combinations.

"Dynamic Seal"—is a device that is intended to act as a fluid seal, and has at least two components in intermittent or continuous relative motion with each other. In general, one of the components is referred to as the seal material, and the other component is referred to as a seal seat. Dynamic seal component interactions can consist of direct contact, or they can be in close proximity, where they are referred to as clearance seals. In general, dynamic seals are not tight fluid seals, due to the relative motion allowing some mass flow across the boundary. Some dynamic seals are designed to allow a quantity of fluid to transfer across from one side to another, and are intended to reduce contaminant mass flow by transferring a fluid in the opposite direction to that of the expected contaminant mass flow direction.

"Displacement Purge"—regeneration of a guard material by flowing a fluid having a reduced contaminant concentration over the guard material without a pressure or thermal swing enhancement.

"Guard Layer"—generally refers to a region of an adsorber comprising a guard material or mixture of guard materials. The guard layer may be positioned adjacent to an adsorbent material by a discrete and by a nondiscrete boundary, such as with a gradient of guard material beginning with guard material at a feed end proceeding along a gradient to completely adsorbent on a second end along a feed direction. A guard layer also may be fluidly coupled to a compartment or support having the adsorbent. Particular embodiments include a region of a guard material that is applied to a support, or a guard material on a first support applied to a second support, to form a laminate. Guard layers may include desiccants. Desiccants that adsorb water strongly (so that the layer is short relative to a layer made with a desiccant adsorbing water less strongly) but with a water isotherm that is reasonably linear (easy regeneration, smallest possible adsorbed water inventory) over the working range are preferred. A particular adsorbent for a desired operation may be selected with "best" properties for that particular PSA operation, but also "good" properties for regeneration, such as by thermal swing, to reduce and preferably substantially eliminate the adsorbed water inventory as a shutdown procedure. The design features include width of layer, steady state accumulated adsorbed water profile, effective diffusion rate and ease of regeneration for alternative desiccants.

"Guard material"—any material useful for reducing the contaminant content of a fluid contacting the guard material, and generally refers to any material that adsorbs contaminants, such as water vapor. For guard layers, guard materials preferably reversibly adsorb contaminants so that any contaminant adsorbed on the guard material can be desorbed by desired processes, or combinations of processes, including heating and/or purging with contaminant-free fluid. Guard materials preferably are selected to both adsorb contaminants at the partial pressure of the feed gas or surrounding atmosphere, and desorb the contaminants at the partial pressure of any purge gas that may be used to regenerate the guard material. Certain zeolites are effective guard materials, but hold some contaminants such as water vapor too tenaciously to be readily removed for regeneration in a substantially continuous PSA process. Currently preferred primary guard layer materials include, without limitation, activated alumina, aluminosilicate gels, silica gels, zeolites, such as zeolite Y materials, activated carbon, carbon molecular sieves and combinations of these materials. These materials are particularly useful because they have a relatively linear isotherm over a large range of contaminant partial pressures, a high capacity for contaminant adsorption, and an ability to adsorb some contaminants even at low relative partial pressures. Plural suitable guard materials also can be used. One example of a useful guard material combination is activated alumina in combination with a zeolite, such as 5A and/or 13X. Many zeolites show relatively linear isotherms at low contaminant partial pressures only, and should be used in conjunction with another guard material. For guard traps the consideration of useful reversible adsorption may not be important and other materials may be more suitable.

"Guard Trap"—refers to a quantity of guard material(s) positioned to contact a fluid to adsorb contaminants, such as being positioned inline with product delivery lines, product reflux lines, etc. Guard traps can be housed as determined by a particular application, or applied to a structure of a device contacting a fluid desirably as contaminant-free as possible, such as applied to internal surfaces of conduits provided for fluid flow. Guard traps can be configured as at least two components in relative motion to each other or as a static structure. Guard traps can be replaceable or regenerable.

"Isolation Valves"—are valves positioned between regions particularly sensitive to contaminants (such as adsorbents, and product and reflux lines) and potential sources of the contaminant. Isolation valves are usually required to provide tight fluid sealing.

"Normal Operation"—operation of PSA process and apparatus for typical generation of product fluid and regeneration processes. For a PSA rotary system, normal operation refers to operations when the rotor or rotors turn at speeds within the range of standard operating speeds for product delivery.

"Parked"—where the PSA process is essentially stopped, and with reference to rotary PSA systems, the relative rotational motion is stopped, or is rotating only intermittently at a rotary cycle speed significantly less than during normal operation. PSA apparatuses can be parked in a number of different conditions including, without limitation, under positive pressure, typically with all ports closed, and under atmospheric pressure, with only certain ports, such as the product end port, sealed. Parked conditions (also referred to as modes) also can vary with different applications. For example, with reference to working embodiments for producing hydrogen, and other fluids that preferably never contact air, a positive pressure park can be used. An atmospheric pressure park can be used where, for example, mixing a process fluid with air does not create a hazardous mixture.

"Parking Seal"—is a seal located in a buffer chamber useful for providing a tight fluid seal. In some embodiments, the parking seal is incorporated into one of the dynamic seals, and is engaged during park mode.

"Partly Sealed Shutdown"—is a shutdown condition whereby product ports are tightly sealed, and the feed ports are relatively tightly sealed. Relief valves may be included to allow pressure adjustments as necessary following shutdown.

"Primary Seal"—is a dynamic seal that has a contaminant-laden fluid on one side of the seal boundary. The primary seal acts as a bound of any buffer space in the apparatus.

"Process Containment Seal"—is a dynamic seal that has the PSA process fluid or the light product on one side of the seal boundary. The light product can be, without limitation, the product, the light reflux, the purge, or the blanket fluid. The process contaminant seal acts as a bound of any buffer space in the apparatus.

"PSA Apparatus"—an apparatus that contains a process fluid and at least one adsorber material and enables a PSA process to occur with the process fluid and the at least one adsorber.

"Purge Fluid"—in general a fluid with a substantially reduced contaminant content used to regenerate adsorber material, guard material or both.

"Recirculated Purge"—recirculation of a purge gas through an auxiliary guard bed, which may be regenerated during normal operation by product purge and/or by thermal swing.

"Shut Down"—the transition event from normal operation to parked condition of the PSA process and apparatus. Particular steps may be implemented to shut down certain apparatuses, or a particular apparatus under different shut down conditions.

"Start Up"—the transition event from parked to normal operation of the PSA process and apparatus. Certain steps in the start up sequence are required in order to ensure that contaminants are not introduced into the adsorbers.

"Static Seal"—generally is a seal between two or more surfaces where there is no relative motion between the two surfaces. Static seals can be, without limitation, gaskets, compression materials, parking seals, etc., where, with proper design, a tight fluid seal is achieved.

"Tight Seal"—or tight shut off or tight fluid seal means a fluid seal where the total contaminant mass flow across the seal boundary over the total time that the seal is in effect in the life of the unit is less than about 0.1% by weight of the adsorber material weight.

II. Description of Start Up, Normal, Shutdown and Park Modes

Contaminants can enter the adsorbent beds via either the feed end or the product end if the adsorbent bed walls defining the space between the feed end and the product end are relatively impervious to any contaminants. In general, the walls are built of materials, such as metals, that are not porous, and do not permeate contaminants, such as water.

A. Normal Operation

In normal operation of known PSA units, contaminant transport from feed fluid entering the feed end is reduced and preferably substantially prevented by using at least one of, and optionally various combinations of, the following measures: (1) using a feed contaminant removal treatment unit upstream of the PSA unit, (2) using a guard layer at the feed end of the adsorbers, and (3) allowing a "sacrificial" layer of the water-sensitive adsorbent adjacent the feed end of the adsorbers to deactivate while functioning effectively as a guard. Typically, 5 to 10% of an adsorber is a guard material such as alumina, silica gel or activated carbon used in the form of a layer before the gas contacts the zeolite adsorbent. Where the contaminant is water, the gas is dried to about 10 to 20 ppm of water vapor before contacting the zeolite adsorbent layers.

Figure 17:
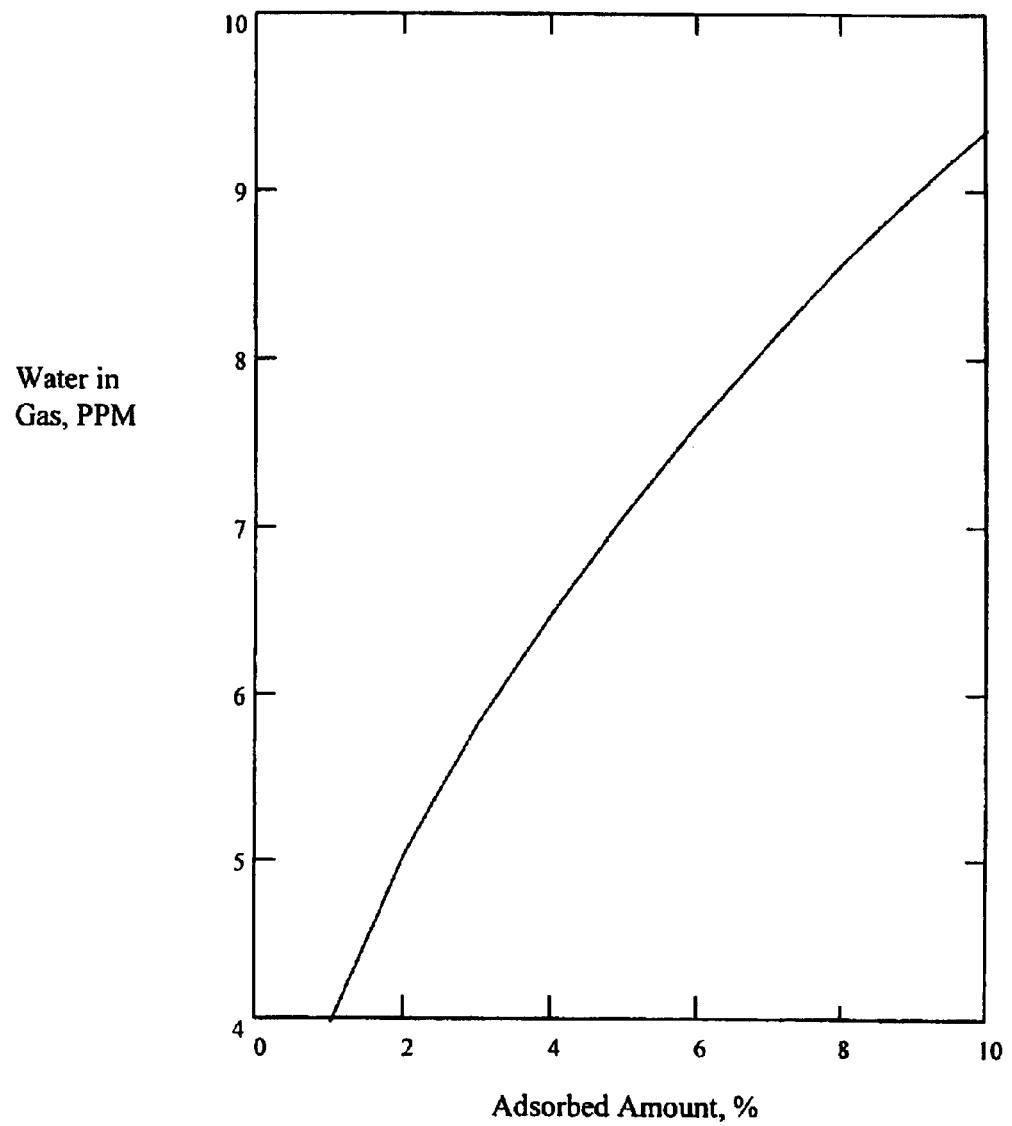
FIG. 17 is an isotherm of water vapor on nitrogen-selective adsorbents for 10 ppm water in a feed gas such as air at 25° C.
Figure 18:
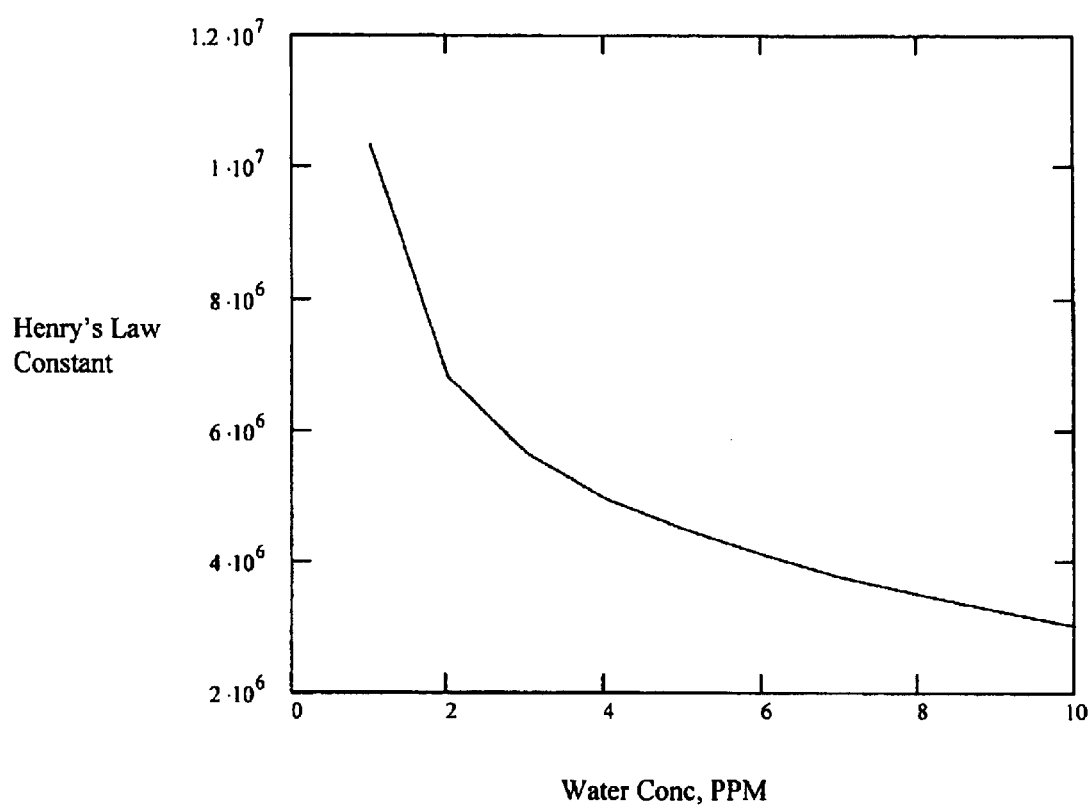
FIG. 18 is a graph of product water concentration (ppm) versus Henry's Law constant illustrating variation of the range of the Henry's Law constant for the isotherm of FIG. 17.

In certain disclosed embodiments, the adsorbers are high-surface-area, laminated adsorbers, with adsorbent supported in thin adsorbent sheets separated by spacers to define flow channels between adjacent sheets. Alternately, several other methods for creating a structural monolith with essentially parallel flow channels are possible. A guard layer may be provided at the feed end of the adsorbent sheets. Laminated adsorbers with a guard layer may be made by coating the leading edge of a support sheet with a suitable guard layer, such as alumina. Alternatively, a separate laminate or monolith section with guard materials may be placed on the feed side of an adsorbent zone of the sensitive adsorbent. Beaded guard materials also are considered in certain embodiments. For example, the mechanism of deactivation of preferred nitrogen-selective zeolites by humidity is related to the extremely strong and nonlinear adsorption of water on these hydrophilic materials. The velocity of propagation of an adsorbate front wave in the constant velocity regime is inversely proportional to Henry's Law coefficient (or isotherm slope at low loading) for the adsorption of that adsorbate. In the case of water adsorption in suitably exchanged LSX zeolites, the Henry's Law coefficient is extremely large and changes quite strongly with the concentration of the adsorbate (see FIGS. 17 and 18). The front would tend to move faster when the concentration in the impurity in the gas being fed is high (lower Henry's Law coefficient) and more slowly during the regeneration step, when the concentration of the impurity is lower.

To clarify this mechanism, consider the following examples. These examples are provided to exemplify certain features of prior known processes, as well as certain features of the present invention. The scope of the present invention should not be limited to those features exemplified.

COMPARATIVE EXAMPLE 1

This example illustrates features of processes known prior to the present invention. An industrial $O_2$ VSA unit operates under conventional cycle frequency (92 s total cycle time) producing $O_2$ at a rate of 40 nm of product/$m^3$ of zeolite per hour. The adsorbent layer is 1.25 m height and below it there is a desiccant layer of activated alumina, designed such that the air leaving the desiccant layer is at 10 ppm of water humidity. The density of the adsorbent is 630 Kg/$m^3$. The process is operated with an upper pressure of 1.7 Bar and the vacuum level reached is of 300 mBar. The purge ratio in the product end is such that the purge velocity is 1.15 times the product velocity.

Calculations performed on the velocity front indicate that the front would take on the order of 10 years to move through the full length of the adsorber. Since the life of an $O_2$ VSA plant in operation is rarely more than 10 years, it is quite likely that the phenomenon of deactivation by humidity will not be noticed through the operation of the plant.

In the above example, the fact that the cycle is run slowly and at low specific production, causing a very low net velocity of the front deactivating the adsorbent combined with a relatively long length of adsorber, yield a low sensitivity of the process towards humidity. The phenomenon exists, but is too slow to be noticed within the normal life of a conventional plant.

COMPARATIVE EXAMPLE 2

This example describes a high speed VSA example that do not use disclosed embodiments of the present invention to limit deactivation of adsorbent materials in PSA processes. A PSA unit using high speed technology is operated at about 2 second total cycle time, with an initial productivity of 880 $m^3$ of product gas/$m^3$ adsorbent per hour, using a laminate module of 0.125 m length, with an adsorbent density of 430 $Kg/m^3$. The adsorbent is a Li-containing LSX zeolite formed in the shape of laminates separated by a spacer. The same adsorbent here is expected to act both as a desiccant and perform the separation of air. The feed consists of air at atmospheric pressure at 90% relative humidity. In 50 days of continual operation, the productivity of the adsorbent has dropped to 500 $m^3$ of product $O_2/m^3$ of adsorber volume (a 43% deactivation) and continues to decay rapidly. The experiment was terminated at this point.

Computer calculations performed on the velocity front indicate that a front of 10 ppm humidity would take about 50 days to deactivate the adsorbent. Since the life of an $O_2$ PSA plant in operation must be of several years, the phenomenon of deactivation is likely to be noticed very rapidly.

In both examples above, the combination of humidity deactivation, faster cycle, reduced adsorber length and higher production rates make the life of the plant undesirably short. Embodiments of the disclosed invention address this problem.

The guard layer may be designed to remove contaminant from the feed fluid to a level such that the total deactivation produced is kept within a reasonable tolerance. In this way, even though the water front moves through the zeolite adsorbent layer completely, the residual capacity of the plant is such that it can be operated indefinitely at such residual capacity. The following example illustrates the method followed.

COMPARATIVE EXAMPLE 3

This example is directed to a high speed embodiment. A high speed PSA is operated at 2 seconds total cycle time, with a productivity of 650 $m^3$ of product gas/$m^3$ adsorbent per hour, using a laminate adsorber of 0.125 m length, with an adsorbent density of 430 $Kg/m^3$. At the product end, the ratio of purge velocity to product velocity is 1.15. A laminate guard layer is used to remove water from the air to 0.07 ppm humidity. The process is run at a high pressure of 1.5 Bar and at a vacuum level of 500 mBar.

Figure 19:
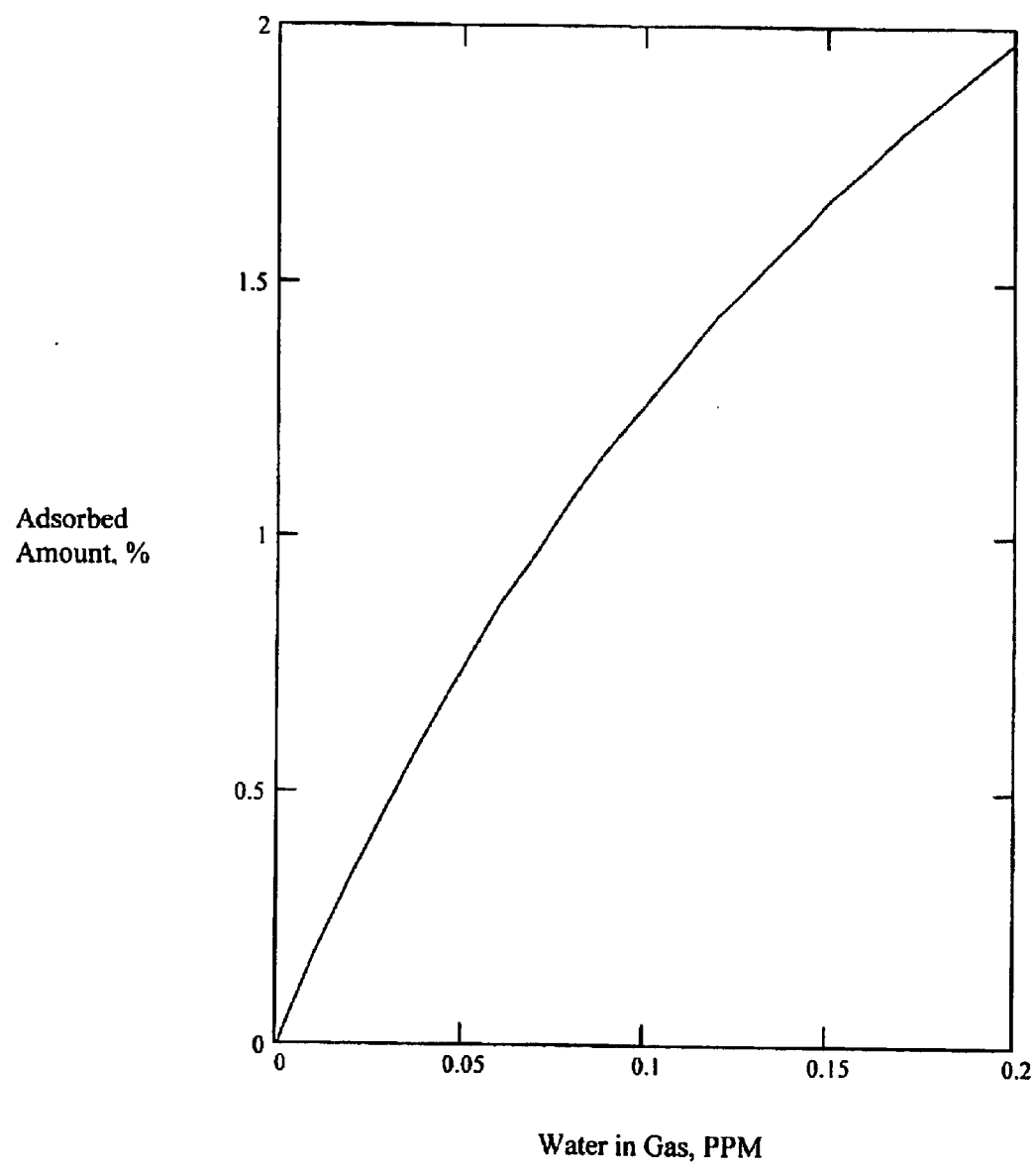
FIG. 19 is an isotherm of water vapor on nitrogen-selective adsorbents for 0.2 ppm water in a feed gas such as air at 25° C.
Figure 20:
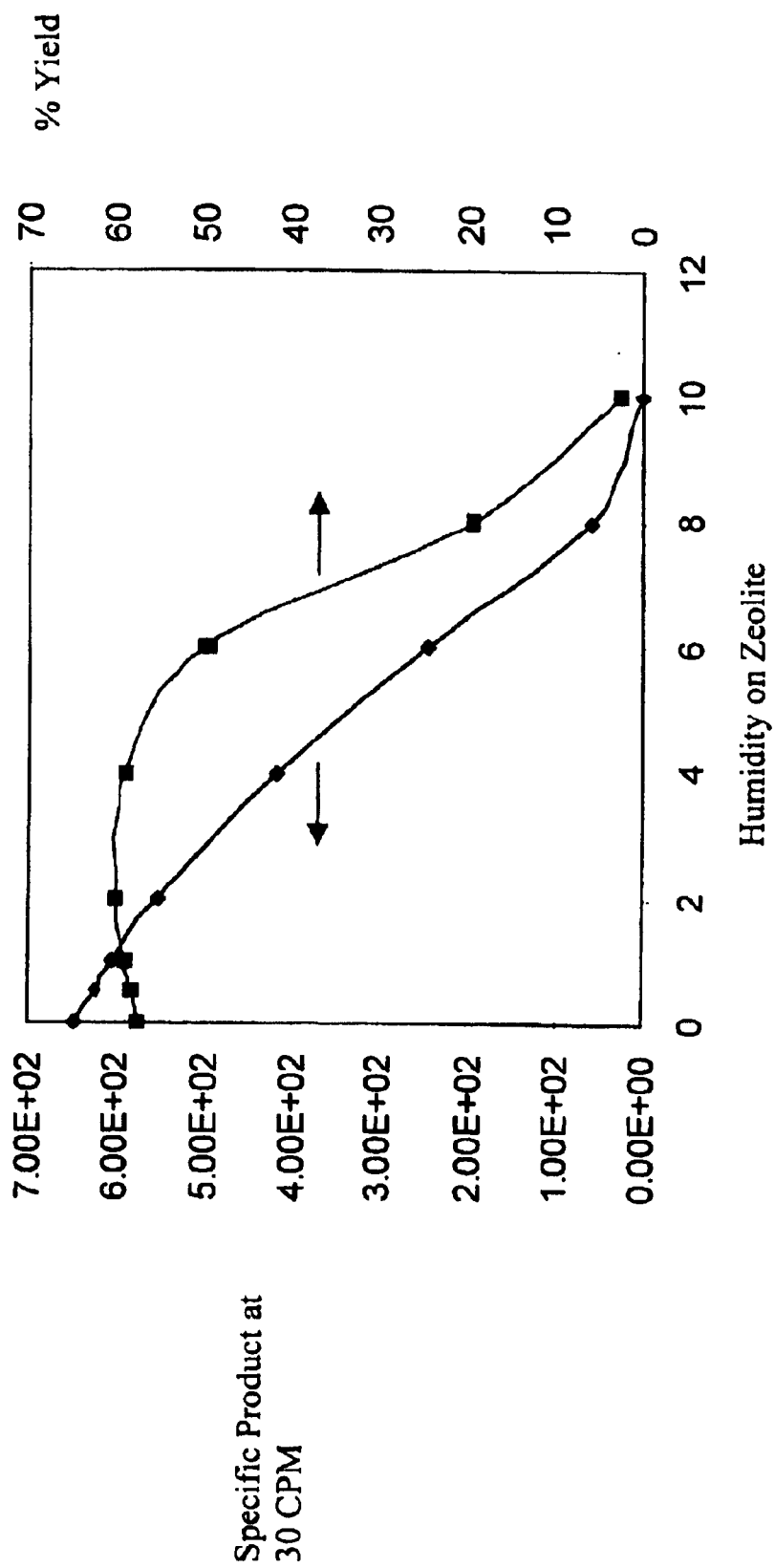
FIG. 20 is a graph of humidity on zeolite versus specific product at 30 rpm illustrating the effect on specific productivity and yield (fractional recovery) on the performance of am oxygen PSA process with a cycle period of 2 seconds.

Calculations performed on the velocity front indicate that the front would take about 100 days to move through the adsorbent. Calculations and computer simulation (see FIGS. 19 and 20) show that the capacity loss of the adsorbent is less than 10% of the initial capacity before the water front migrated through the bed. A productivity of around 600 $m^3$ of product gas/$m^3$ of adsorbent per hour can now be sustained indefinitely.

Table I below shows the level of humidity that can be achieved using different desiccant layer lengths as a fraction of total adsorber length, as obtained by computer simulation. For the example illustrated above, the desiccant layer should be slightly above 20% of total length of the adsorber. Using this design method, the maximum deactivation that the plant can suffer can be limited to tolerable levels.

TABLE I

Design of Alumina Layer
Typical humidity levels achieved at
boundary between alumina desiccant layer and Li-LSX
layer in oxygen production adsorber.

| Length fraction of alumina desiccant layer in adsorber | Humidity level achieved (ppm) |
|---|---|
| 50% | 0.00093 |
| 20% | 0.073 |
| 10% | 14.42 |

Although the previous examples discussed water contamination, similar calculations and experiments can be made with any contaminant in the feed gas mixture, especially with hydrocarbon mixtures. Contamination of the feed end by contaminants contained in the surrounding atmosphere also must be considered when designing the guard material layer.

The length of any guard layer used can vary. Working embodiments of laminate adsorbers for producing enriched oxygen from air have desiccant layer lengths of from about 10% to about 40% of the adsorber length, and preferably from about 15% to about 25% of the adsorber length.

The mechanism of contamination of the adsorbers from the product end is understood as a parametric pumping effect in which the contaminant front driven back is (countercurrent to feed flow) towards the feed end of the adsorbers. The contaminant enters into the adsorber during the regeneration step, and the front moves backwards in the adsorber. During the feed/production step, the front will tend to move forward, but the contaminant will only be incompletely expelled. The net movement in this case is backwards, due in part to the lower Henry's Law coefficient of the higher concentration front during regeneration, and due to the higher velocity of gas used during the regeneration step. The product end is more susceptible to contamination as there is no guard material layer mechanism that can stop or reduce the rate of poisoning or deactivation.

The rate of humidity penetration from the product end is very slow in conventional PSA, as given in the example below.

COMPARATIVE EXAMPLE 4

This example describes a currently known process. An industrial $O_2$ VSA unit operates under conventional cycle frequency (82 s total cycle time) producing $O_2$ at a rate of 45 $nm^3$ of product/$m^3$ of zeolite per hour. The adsorbent layer is 1.80 m in height and below it there is a desiccant layer of activated alumina. The density of the adsorbent is 670 $Kg/m^3$. The process is operated with an upper pressure of 1.34 Bar and the vacuum level reached is of 395 mBar. The purge ratio in the product end is such that the purge velocity is 1.132 times the product velocity. The in-leak of humidity is such that the purge gas used in regeneration contains 10 ppm of water.

Calculations performed on the backwards velocity front indicate that this front would take in the order of 11 years to deactivate the adsorbent. Since the life of an $O_2$ VSA plant in operation is rarely more than 10 years, it is quite likely that the phenomenon of deactivation by humidity will not be noticed through the operation of the plant.

Again, in this case, conventional PSA is not sensitive to this product end in-leak, but the situation can change dramatically as the frequency of operation increase.

COMPARATIVE EXAMPLE 5

This example concerns a high speed operation. A high speed $O_2$ PSA unit operates at a total cycle time of 1.3 seconds producing $O_2$ at a rate of 1000 nm$^3$ of product/m$^3$ of zeolite per hour. The laminate adsorber is 0.25 m long. The density of the adsorbent is 480 Kg/m$^3$. The process is operated with an upper pressure of 1.34 Bar and the vacuum level reached is 395 mBar. The purge ratio in the product end is such that the purge velocity is 1.188 times the product velocity. The in-leak of humidity is such that the purge gas used in regeneration contains 10 ppm of water.

Calculations performed on the backwards velocity front indicate that this front would take in the order of 4 months to deactivate the adsorbent. Such a short operation life is not acceptable for a PSA plant.

COMPARATIVE EXAMPLE 6

A high speed PSA made with Li-containing LSX zeolite was operated at 1.2 seconds cycle time under conditions of VSA. The feed air was dried by passing it through a large bed of activated alumina to remove humidity to less than 1 ppm. Through normal leaks in the product end, the product $O_2$ gas contained 20 ppm of humidity. At the beginning of the run, the productivity of the module was of 1050 nm$^3$ $O_2$/m$^3$ of adsorber volume. After 330 hours of operation (14 days), the productivity had dropped to 910 nm$^3$ $O_2$ gas/m$^3$ of adsorbent. The experiment was interrupted at this stage.

In the examples above, a water vapor front moved quickly through the adsorber. Other contaminants, most of which have lower Henry's Law coefficients than water on LSX zeolite, will move through the adsorber in less time for the same contaminant level. Although the phenomenon exists in conventional PSA, high speed PSA and rotary PSA are especially susceptible to reduced useful life due to contamination of the product end of adsorbers. By using the techniques and devices of the invention, conventional PSA can also benefit (a) in order to extend the useful life of the adsorbers, and (b) reducing the risk of unexpected poisoning due to static or dynamic seal leakages or failures.

The object is to prevent contaminant ingress into the product end of the adsorbers from all pathways. Contaminant leakage into product valve and lines must be minimized, and preferably substantially eliminated. Hence, steps should be taken to minimize boundary layer back-diffusion and surface diffusion from downstream product lines, valves and receivers; and to have tight shut-off valves to close the product delivery line when the unit is shut down.

One option is to fully seal the whole light end of the adsorbers and associated fluid conduits and valves in a tight fluid seal container using only static seals and non-pervious materials. One way of doing this is to eliminate all dynamic seals exposed to either feed gas or surrounding atmosphere contaminants, such as using bellows valves or fully fluid contained valves actuated by magnetic forces. Another is to house all valves in a metal or other non-pervious (to contaminants) container. Added protection includes using a buffer fluid inside the container, where the use of product gas is a preferred option. Circulating and refreshing the buffer fluid add another layer of protection to contaminant ingress.

The objective of multiple resistances in the path of contaminant ingress to the product end is preferred. Contaminant leakage prevention is especially difficult for the circumferential seals of relatively large diameter, rotary multiport distributor valves, although actuator packing of any type of directional valve will provide potential pathways for contaminant ingress. Diffusion forces, in addition to, or in spite of, fluid forces can often create contaminant ingress where none would be normally expected. One approach to addressing this ingress is to provide a buffer space between the process containment seal communicating to the product ends of the adsorbers and the primary seal communicating with any contaminant-laden fluid. Embodiments of a buffer space are described below with reference to the drawings. The buffer space may be a positive pressured zone, a dry fluid zone, such as a dry product flushed zone with flushing circulation conveniently provided by delivered product flow, both, or an evacuated zone. The refreshment (flushing) of any fluid in the buffer space can be done through ports and/or by using leakage of the dynamic seals. Additional embodiments preferably direct the circulated flow in a direction opposing the path of contaminant ingress. The buffer space preferably also can be sectioned into two or more buffer chambers by a buffer seal, introducing at least one more resistance to contaminant ingress. The buffer seal preferably has a small sealing length, or if circular the buffer seal has a small diameter. The gas introduced to the buffer space preferably is circulated so that the contaminant level in the buffer space fluid is minimized.

Where the option of using multiple resistances is not used, the process containment seal and the primary seal are one and the same, and there is no buffer space. In this case, the use of a clearance type dynamic seal is preferred if the light product end is at higher pressure than the contaminant-laden fluid, as the flow of the product gas will reduce ingress of contaminants. Adding a guard trap for the product gas flow to flow through or by is also a preferred option. When the product fluid is at lower pressure than the contaminant-laden fluid, the use of a dynamic seal coupled with a guard trap, preferably replaceable, is preferred.

Another option is a system where the adsorbers are maintained by periodic regeneration or replacement.

Embodiments of the disclosed system and method include placing guard traps in at least one, typically plural, and potentially all, light reflux lines (and the buffer space of any directional valve) to capture any mobile contaminant, such as upon initial start-up, or upon start-up after any maintenance intervention which may have introduced humid air or other contaminant into the PSA unit. The capacity and selectivity of such guard traps may be maintained by periodic regeneration or replacement. The guard traps in light reflux lines may serve usefully as surge absorber chambers or equalization buffer tanks.

If one of these guard traps is in the product line, its steady state humidity level substantially corresponds to that of the dry delivered product. For target water vapor pressures at the product end, such as in those areas surrounding product delivery conduits, lines, or chambers, should be substantially that of the selected adsorbent material in this instance at the product end, which typically ranges from about 0.005 pa to about 0.1 pa at 30° C. If a previously water-loaded guard trap is fluidly coupled to the light product, it may be regenerated by displacement purge of product gas. An auxiliary valving arrangement may be used to rotate switch guard traps between the light reflux lines and the product line for displacement purging. Product fluid also may be used to regenerate any guard traps used as (1) a contaminant sink for regenerating the guard layer at the front end of the adsorbers, or (2) guard traps for breather lines when the unit is shutdown.

B. Shutdown Procedures

Forward diffusion of contaminants previously adsorbed in the guard layer of the adsorbers may progressively deactivate the contaminant-sensitive adsorbent whenever the PSA unit is shut down. Alternative disclosed approaches for addressing forward diffusion include (1) isolation valves, (2) purging during shutdown in order to reduce the contaminant content of the guard layer, (3) operating at relatively higher temperatures in normal operation to reduce steady state content of contaminant in guard layer, (4) cooling the guard layer during parked mode, (5) providing intermittent or continuous purge during parked mode, and (6) providing intermittent start up and/or normal operation sequences during park mode to drive back the diffusion front to prevent contamination of the contaminant sensitive adsorber material, and all possible combinations thereof. These alternatives are used for all the adsorbers on the PSA plant.

The guard layer may be regenerated to eliminate some, and preferably most of, the adsorbed contaminant in the layer. Initial guard layer regeneration can be achieved by an automatic back purge with stored dry fluids, such as product gas, upon shutdown. As a large volume of stored purge gas would be required to achieve substantially complete regeneration of the guard layer, the effectiveness of regeneration may be enhanced by back purging with the assistance of a vacuum pump, thereby raising the velocity of the purge flow.

Purge flow also can be introduced by using the feed gas. The normal regeneration gas, starting as the feed gas, passes through the guard layer in both directions. In order to enhance the regeneration action over normal operations, the feed gas can be pre-cleaned before it reaches the guard layer, or the forward flow can be reduced by substantially reducing the product flow, or both. Certain disclosures follow below with reference to the figures.

A greater enhancement of guard layer regeneration may be achieved by auxiliary heating of the guard layer during the shutdown procedure and while back purging is underway, with or without vacuum assist. Alternative heat sources include auxiliary resistance heaters, inductive eddy current heating (e.g. of a metallic mesh or foil in the adsorbent sheets) or microwave radiation.

Microwave assisted desorption also can be used. For example, microwaves can be used to desorb gases from adsorbents. Particular adsorbents, such as NaX zeolites, strongly absorb microwaves, and hence particular zeolites can be selected for their ability to adsorb microwaves to desorb absorbed gases. Moreover, structures, such as metal structures, can be provided to confine microwaves to a desired area, such as desiccant and/or adsorbent areas. For example, microwave energy can be delivered to a rotary PSA module using a gas cleaning "wheel" having metal segment separators to confine the microwaves to a particular segment of the module.

The use of microwaves for desorbing water and other adsorbed materials is known in the patent literature, including U.S. Pat. No. 4,322,394 to Mezey et al., U.S. Pat. No. 5,227,598, U.S. Pat. No. 5,282,886 to Kobayashi et al., U.S. Pat. No. 5,429,665 to Botich, U.S. Pat. No. 5,509,956 to Opperman et al., U.S. Pat. No. 5,766,311 to Ackley et al., and U.S. Pat. No. 6,022,399 to Ertl et al.

Alternatively, heat may be provided to the guard layer by deliberately increased heating of the purge fluid, by the vacuum pump and compressor operating with recirculating gas flows, or by heat exchangers in fluid contact with the purge gases. The PSA feed compressor can provide heated fluid, for example, or even run at higher than normal pressure ratio during shutdown, to both increase the heat of the feed gas and to increase the purge function. A direct method of heating the guard layer is by rotary valve seal friction that may be increased by increasing valve face mechanical loading.

Reduced contaminant loading of the guard layer is possible when the operating temperature of the PSA is raised. This may assist in reducing the length of time or volume of purge gas required to clean the guard layer.

Forward diffusion of contaminants can be reduced using plural guard layers. A first guard material can be separated from at least a second guard material, the guard material layers may abut, or there may be a blend of at least a first and second guard material. A second guard material with reference to fluid flow along a flow path from the feed end to the adsorbent may have a larger capacity and a stronger affinity for the contaminant than a first guard material to reduce forward diffusion rates.

Even with vacuum assist and auxiliary heating of the guard layer, the volume of purge gas required for back purging may be unreasonably large. Hence, another feature of the invention is to extend back purge using a vacuum pump for recirculated purge by product gas through a guard trap, which is regenerated during normal operation by product flow through that guard trap and/or by thermal swing heating.

Once completed, or in conjunction with reducing the contaminant load in the guard layer, a blanket gas can be introduced in order to provide for an elevated park pressure, so that all leakages in the system are directed outward and/or to displace the existing fluids in the adsorbers and associated flow passages.

C. Parked Mode

A proper shutdown procedure protects the contaminant-sensitive adsorbent zones from deactivation. Isolation valves may be provided between the guard layer and the sensitive adsorbent zones in each adsorber. These valves are open whenever the unit is operating, but are closed automatically whenever the unit stops. The isolation valves may be normally closed, and then opened either by admission of feed pressurized above ambient or by rotation of the rotary PSA module of preferred embodiments or by a signal, such as electrical or pneumatic. The isolation valves preferably provide a tight fluid seal to withstand any pressure fluctuations due to ambient temperature variations and to minimize the mass flow of contaminants across the valve.

In some variations, the opposition of contaminant diffusion driven motion in parked mode can be assisted by periodically restarting the PSA in normal mode, which resets the contaminant front toward the feed end of the guard layer. Alternately, an intermittent or continuous purge gas or blanket gas can be fed into the adsorbers to offset the diffusion mass flow of the contaminant.

The shut down procedures preferably are designed to place a PSA unit in a contaminant-safe parked condition under which contaminant leakage into the product end of the adsorbers is minimized and preferably substantially eliminated by appropriate tightly sealed shut-off valves and/or non-return valves. During normal operation, any dynamic seal should be designed for low friction and long life. Sealing tightness does become more important during shutdown to minimize and preferably substantially eliminate any direct ingress of contaminants across dynamic seals required for normal operation. Tight sealing of buffer chambers may be augmented by engaging parking seal(s). Another resistance to contaminant ingress is the use of guard traps in buffer chambers, preferably if provisions for replacement or regeneration are made. Guard traps also can be placed around the primary seal outside the buffer chamber or process containment zone.

The adsorber capacity for adsorbing fluids are affected by temperature changes, where high and low fluctuations in temperature will decrease and increase respectively the adsorbed capacity of the adsorbers. Without careful management of the PSA, contaminant ingress is possible when the PSA unit is parked, as it may be externally exposed to a contaminant-laden atmosphere such as humid air, or it may be exposed to contaminant-laden feed gas, and it is subjected to normal fluctuations of diurnal temperature and barometric pressure. The invention next addresses the issue of preventing or managing "breathing" in and out of the adsorbers of the PSA unit, due to this "thermal cycling".

In one aspect of the invention with several embodiments, the contaminant-sensitive zone of the PSA unit is totally or at least partially sealed while parked. As mentioned above, steps are taken to ensure that any contaminant left on the guard layer is minimized or a method is used to reduce or minimize the rate of diffusion into the contaminant-sensitive zone. In order to minimize any internal increase or decrease in fluid pressure due to temperature fluctuations, an option is to fully insulate the PSA unit or to provide the adsorbers with a conditioned atmosphere such as an air conditioned room, or a continuously or intermittently circulated blanket gas, conditioned to constant temperature. An option is for a recirculating conditioned blanket gas that can be continuously cleaned through guard traps, which can be recharged while in normal operation by the product fluids.

In a completely sealed shutdown, the PSA unit (or its contaminant-sensitive zone) is tightly sealed on all ports after shutdown. As the unit cools from its normal operating temperature (here assumed to be somewhat above normal ambient temperature), it can pull a strong vacuum, which may be further enhanced while adsorbed components redistribute by diffusion. A positive pressure blanket fluid can keep the tightly shut off adsorbers and connected fluid passages above ambient pressure at all times. A pressure regulator, or relief valve, can be installed downstream of a blanket gas supply to ensure a minimal pressure difference to ambient, such as in some cases 100 kPa. A relief valve can be provided to vent any excess fluid if the pressure starts cycling up to higher pressures as a result of any slow leakage inward, or as a result of inadvertent heating of the unit.

In another disclosed embodiment, the PSA unit is tightly sealed on all feed and exhaust end ports and seals, but the product end is connected to a blanket gas supply so as to allow breathing in response to changes of ambient temperature and barometric pressure.

In another disclosed embodiment, the PSA unit is tightly sealed on all product end ports and seals, but is only partially sealed on feed ports so as to allow restricted breathing in response to changes of ambient temperature and barometric pressure. Crossover relief valves with a low cracking pressure setting may be provided to permit limited feed end breathing only as required to prevent excessive overpressure or vacuum differentials that would overload the unit structurally or cause some risk that breathing of humid air into the product end may take place despite all precautions.

In certain embodiments, the feed end blanket gas can be substituted for ambient air (where mixing of air with the process gases is not detrimental or hazardous), or any other contaminant-laden fluid, and any breathing of this fluid into the feed end of the PSA unit would be through the guard layer at the feed end of adsorbers. A breather may be provided to the feed or exhaust port communicating to the feed end of the PSA unit. Further, the breather can be coupled to a guard trap, where the fluids inhaled and expelled by the adsorbers passes through the guard trap.

A further refinement for an air separation PSA is thermal design of air breather and air breather guard trap in conjunction with the PSA module, so that ambient temperature swings penetrate the guard trap associated with the air breather rapidly and penetrate the PSA module more slowly. Hence a phase shift is established between temperature swings in the air breather guard trap and air flows through that guard trap, as those air flows will be in phase with the rate of delayed temperature change within the adsorbers of the PSA unit. Air flow into the PSA unit occurs as it is cooling down, after the air breather guard trap has already cooled down so as to adsorb humidity more strongly. Air flow out of the PSA unit occurs as it is warming up, after the air breather guard trap has already warmed up so as to release adsorbed water vapor.

Consequently a thermal swing adsorption (TSA) process is established in the air breather guard trap, operative to slowly expel water out of the PSA unit on a 24-hour nominal cycle. This auxiliary TSA humidity expulsion process could have passive solar augmentation for extra thermal swing. The air breather guard trap may be designed with a large volume and a long flow path to minimize the rate of nitrogen mixing into oxygen within the adsorbers. The above device and method also can be used with other fluids and contaminants, based on the content of the feed gas and blanket gas used.

The breather may be provided as a long tube (with or without guard trap) to retard bulk mixing of contaminant-laden blanket gas and dry product gas in the adsorbers. Tests of this embodiment have established that the rate of adsorbent deactivation under air breathing (as forced by cyclic ambient temperature variations) is greatly retarded by a breather whose internal volume may be much less than the adsorbed and desorbed volume.

Yet another aspect of the invention is to provide an air breather as an inflated bag diaphragm approximately equilibrated with ambient pressure, to prevent bulk mixing of humid external air with dry oxygen within the adsorbers.

Non-uniform adsorber degradation can result when a PSA unit is parked because adsorbers receive different shutdown circulation patterns and contaminant exposure. This risk may be addressed by any of the following measures: (1) remove contaminants very stringently upon shutdown, and then seal tightly, (2) periodically turn rotor during shutdown, or (3) lift valve face(s) off seat during shutdown so that all adsorbers are vented together.

D. Start Up Procedures

Starting up the PSA from a park mode requires care that the contaminant-laden fluids enter the adsorbers in a manner that does not over load the guard layer. If the guard layer is relatively cooler than normal operating temperature, reduced loading of the guard layer by the feed gas contaminants is achieved by: (1) reducing feed flow or product flow by throttling or reduced pressure swing, (2) increasing cycle speed above normal operation, and (3) using a guard trap in the feed conduit. It is preferable to get to normal operating temperatures as quickly as possible, ensuring that the guard layer does not heat up substantially faster than the adsorbent zone.

To reduce the risk of contaminant ingress in the product end, it is preferable to provide any buffer space with a flush before opening any parking seal, and to ensure that any buffer gas is at operating pressure and capable of operating flow before disengaging any parking seal. Other systems used in contaminant ingress resistances should be made ready before the PSA process is started, and any dynamic seals operated.

III. Description of Exemplary PSA Systems with Reference to Drawings

Embodiments of the described apparatus, systems, and method for their operation concern PSA systems generally including, without limitation, stationary bed, rotating bed and rotating valve systems. However, the embodiments illustrated by the drawings particularly concern rotary PSA systems, both axial and radial fluid flow, having relatively high apparatus rotary cycle speeds, such as about 10 cycles per minute or greater, and more typically about 30 cycles per minute or greater.

A. FIGS. 1–6

FIG. 1 shows one embodiment of a rotary, axial flow PSA module 1, particularly suitable for smaller scale oxygen generation. Water management features described with reference to axial flow systems also generally may be applicable to radial flow embodiments. One embodiment of a radial flow PSA module is described with reference to FIG. 6. References to water contamination and oxygen separation PSA are, as stated previously, not limited to water, but include all contaminants that can poison or deactivate the adsorbers.

With reference to FIG. 1, Module 1 includes a number "N" of adsorbers 3 in adsorber housing body 4. Each adsorber has a first end 5 and a second end 6, with a flow path therebetween contacting a nitrogen-selective adsorbent. Each adsorber has a first zone 3A adjacent its first end, and a second zone 3B extending to the second end. First zone 3A, the guard layer, contains a guard material such as activated alumina or a zeolite adsorbent, and second zone 3B contains a water-sensitive nitrogen-selective adsorbent as further described below. Typically, zone 3A extends over about 20% of the adsorber length between the first and second ends, and zone 3B (which may in turn be subdivided into a plurality of zones containing different adsorbents) is the remaining 80%. The adsorbers are deployed in an axi-symmetric array about axis 7 of the adsorber housing body. The housing body 4 is in relative rotary motion about axis 7 with first and second valve bodies 8 and 9. Housing body 4 is engaged across a first valve surface 10 with the first valve body 8, to which feed air is supplied and from which nitrogen-enriched air is withdrawn as the heavy product. And, housing body 4 is engaged across a second valve surface 11 with the second valve body 9, from which oxygen-enriched air is withdrawn as the light product.

In some embodiments (partially shown in FIGS. 16 and 17), the adsorber housing body may be stationary, while the first and second valve bodies rotate. In those preferred embodiments as particularly depicted in FIGS. 1–5, the adsorber housing 4 rotates and shall henceforth be referred to as the adsorber rotor 4, while the first and second valve bodies are stationary and together constitute a stator assembly 12 of the module. The first valve body shall henceforth be referred to as the first valve stator 8, and the second valve body shall henceforth be referred to as the second valve stator 9. The annular space defined by stator 12 and adsorber rotor 4 is required for rotational clearance, and is referred to as clearance gap 13.

In the embodiment in FIGS. 1–5, the flow path through the adsorbers is parallel to axis 7, so that the fluid flow direction is axial, while the first and second valve faces are shown as flat annular discs normal to axis 7. However, more generally the flow direction in the adsorbers may be axial or radial or at some angle in between, and the first and second valve faces may be any figure of revolution centered on axis 7. In the embodiment of FIG. 6, the flow path through the adsorber is perpendicular or transverse to axis 7 so that fluid flow is radial. The steps of the process and the functional compartments to be defined will be in the same angular relationship regardless of a radial, or axial (or some angle in between) flow direction in the adsorbers.

FIGS. 2–5 are cross-sections of module 1 in the planes defined by arrows 14–15, 16–17, and 18–19. Arrow 20 in each section shows the direction of rotation of the rotor 4.

Figure 2:
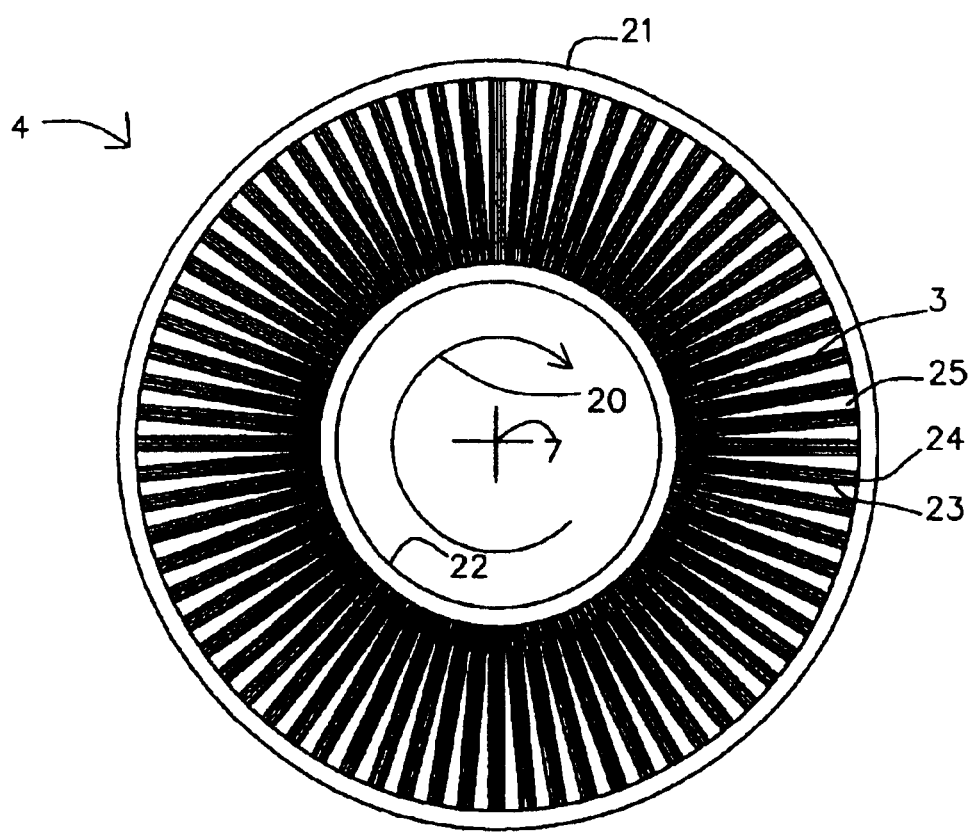
FIGS. 2 through 5B show transverse sections of the module of FIG. 1.

FIG. 2 shows section 18–19 across FIG. 1, which crosses the adsorber rotor. Here, "N"=72. The adsorbers 3 are mounted between outer wall 21 and inner wall 22 of adsorber rotor 4. In this illustration, each adsorber comprises a rectangular flat pack 3 of adsorbent sheets 23, with spacers 24 between the sheets to define flow channels here in the axial direction. Separators 25 are provided between the adsorbers to fill void space and prevent leakage between the adsorbers.

The adsorbent sheets comprise a reinforcement material, in preferred embodiments glass fiber, metal foil or wire mesh, to which the adsorbent material is attached with a suitable binder. For air separation to produce enriched oxygen, typical adsorbents in second zone 3B are X, A or chabazite type zeolites, typically exchanged with lithium, calcium, strontium, magnesium and/or other cations, and with optimized silicon/aluminum ratios as well known in the art. The zeolite crystals are bound with silica, clay and other binders, or self-bound, within the adsorbent sheet matrix.

Satisfactory adsorbent sheets have been made by coating a slurry of zeolite crystals with binder constituents onto a reinforcement material, with successful examples including non-woven glass fiber scrims, woven metal fabrics, and expanded aluminum foils. Spacers are provided by printing or embossing the adsorbent sheet with a raised pattern, or by placing a fabricated spacer between adjacent pairs of adsorbent sheets. Alternative satisfactory spacers have been provided as woven metal screens, non-woven glass fiber scrims, and metal foils with etched flow channels in a photolithographic pattern.

Typical experimental sheet thicknesses have been 150 microns, with spacer heights in the range of 100 to 150 microns, and adsorber flow channel length approximately 20 cm. Using X-type zeolites, excellent performance may be achieved in oxygen separation from air at PSA cycle frequencies in the range of 20 to 300 cycles per minute. Lower cycle speeds can be used to produce a product fluid, if desired.

Figure 3:
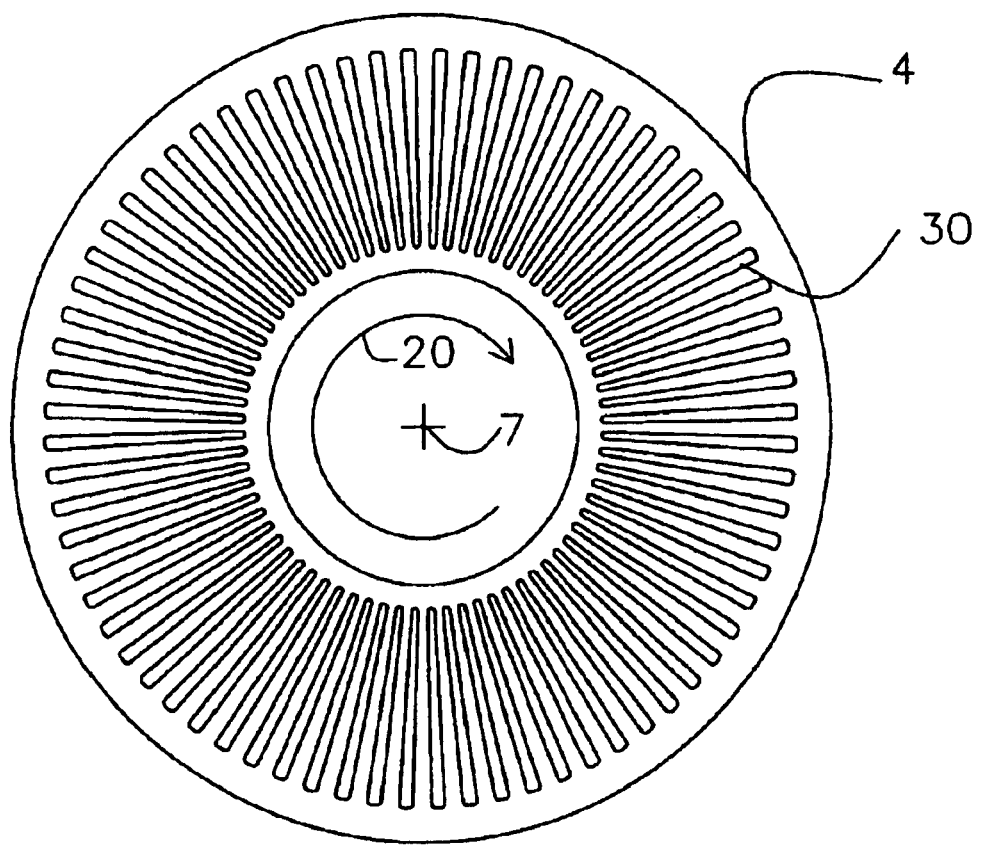

FIG. 3 shows the porting of rotor 4 in the first and second rotor valve faces respectively in the planes defined by arrows 14–15, and 16–17. Adsorber ports 30 provide fluid communication directly from the first end 5 or second end 6 of each adsorber to respectively the first or second rotor valve face.

Figure 4A:
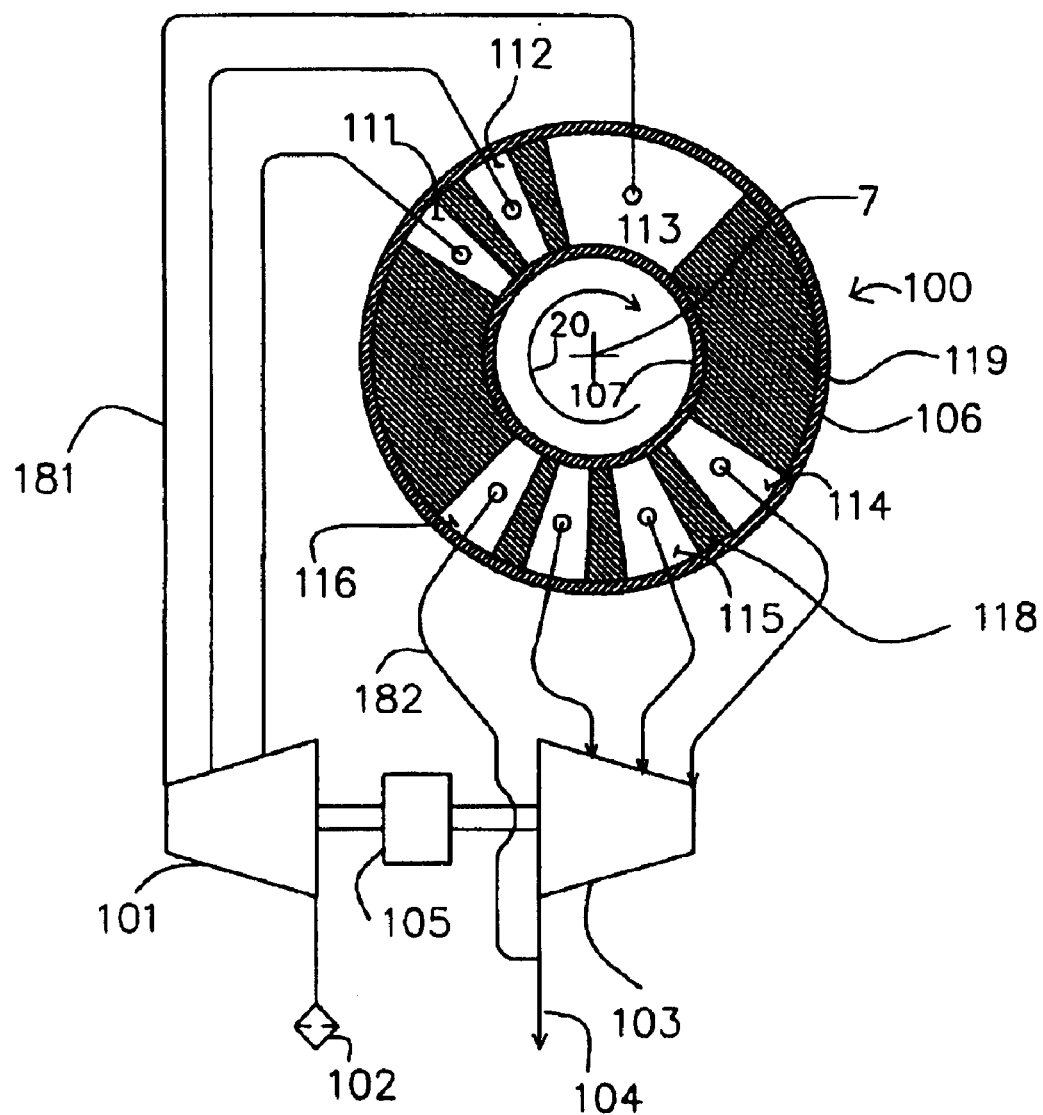

FIG. 4A shows the first stator valve face 100 of the first stator 8 in the first valve face 101, in the plane defined by arrows 14–15. Fluid connections are shown to a feed compressor 101 inducting feed air from inlet filter 102, and to an exhauster 103 delivering nitrogen-enriched second product to a second product delivery conduit 104. Compressor 101 and exhauster 103 are shown coupled to a drive motor 105.

Arrow 20 indicates the direction of rotation by the adsorber rotor. In the annular valve face between seals 106 and 107, the open area of first stator valve face 100 ported to the feed and exhaust compartments is indicated by clear angular segments 111–116 corresponding to the first functional ports communicating directly to functional compartments identified by the same reference numerals 111–116. The substantially closed area of valve face 100 between functional compartments is indicated by hatched sectors 118 and 119, which are slippers with, zero clearance, or preferably a narrow clearance to reduce friction and wear without excessive leakage. Typical closed sector 118 provides a transition for an adsorber, between being open to compartment 114 and open to compartment 115. Gradual opening is provided by a tapering clearance channel between the slipper and the sealing face, so as to achieve gentle pressure equalization of an adsorber being opened to a new compartment. Much wider closed sectors (e.g. 119) are provided to substantially close flow to or from one end of the adsorbers when pressurization or blowdown is being performed from the other end.

The feed compressor in this embodiment provides feed air to feed pressurization compartments 111 and 112, and to feed production compartment 113. Compartment 113 is connected to the compressor 101 via conduit 181. Compartments 111 and 112 have successively increasing working pressures, while compartment 113 is at the higher working pressure of the PSA cycle. Compressor 101 may thus be a multistage or split stream compressor system delivering the appropriate volume of feed flow to each compartment so as to achieve the pressurization of adsorbers through the intermediate pressure levels of compartments 111 and 112, and then the final pressurization and production through compartment 113. A split stream compressor system may be provided in series as a multistage compressor with interstage delivery ports; or as a plurality of compressors or compression cylinders in parallel, each delivering feed air to the working pressure of a compartment 111 to 113. Alternatively, compressor 101 may deliver all the feed air to the higher pressure, with throttling of some of that air to supply feed pressurization compartments 111 and 112 at their respective intermediate pressures. In some preferred embodiments (not shown), the PSA apparatus are not directly connected with a compressor, as in most hydrogen separation apparatus, or do not require any compression of feed gas from it's source.

Similarly, exhauster 103 exhausts heavy product gas, such as nitrogen-enriched gas, from countercurrent blowdown compartments 114 and 115 at the successively decreasing working pressures of those compartments, and finally from exhaust compartment 116, which is at the lower pressure of the cycle. Similarly to compressor 101, exhauster 103 may be provided as a multistage or split stream machine, with stages in series or in parallel to accept each flow at the appropriate intermediate pressure descending to the lower pressure.

In the example embodiment of FIG. 4A, the lower pressure is ambient pressure, so exhaust compartment 116 exhaust directly to heavy product delivery conduit 104. Exhauster 103 thus provides pressure letdown with energy recovery to assist motor 105 from the countercurrent blowdown compartments 114 and 115. For simplicity, exhauster 103 may be replaced by throttling orifices as countercurrent blowdown pressure letdown means from compartments 114 and 115.

Figure 4B:
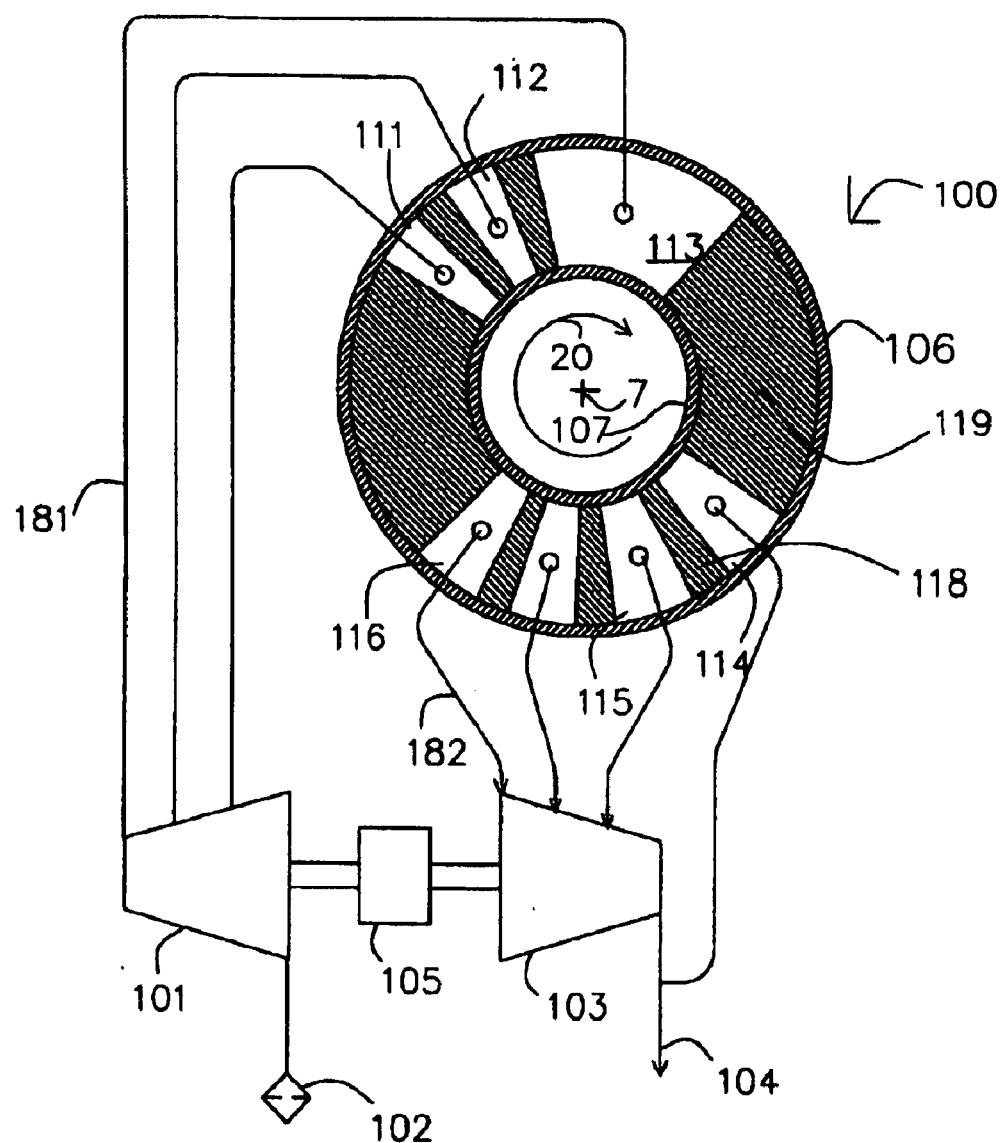

In some preferred embodiments, the lower pressure of the PSA cycle is subatmospheric. Exhauster 103 is then provided as a vacuum pump, as shown in FIG. 4B. Again, the vacuum pump may be multistage or split stream, with separate stages in series or in parallel, to accept countercurrent blowdown streams exiting their compartments at working pressures greater than the lower pressure, which is the deepest vacuum pressure. In FIG. 4B, the early countercurrent blowdown stream from compartment 114 is released at ambient pressure directly to heavy product delivery conduit 104. If for simplicity a single stage vacuum pump were used, the countercurrent blowdown stream from compartment 115 would be throttled down to the lower pressure over an orifice to join the stream from compartment 116 at the inlet of the vacuum pump.

Figure 5A:
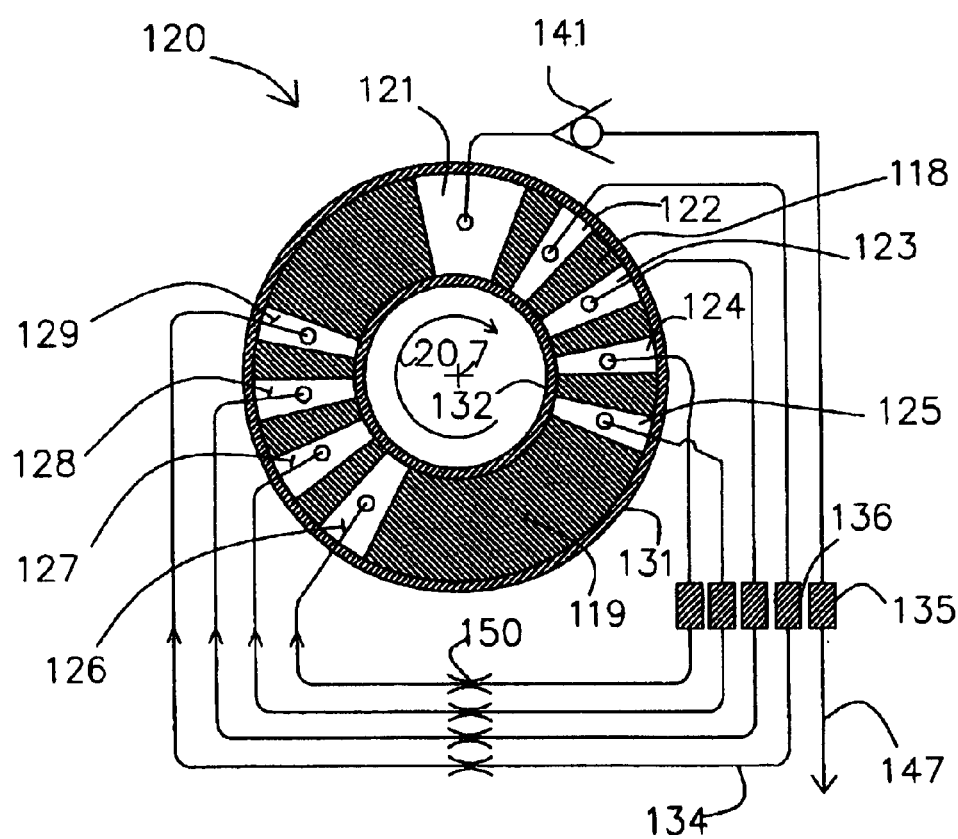
Figure 6:
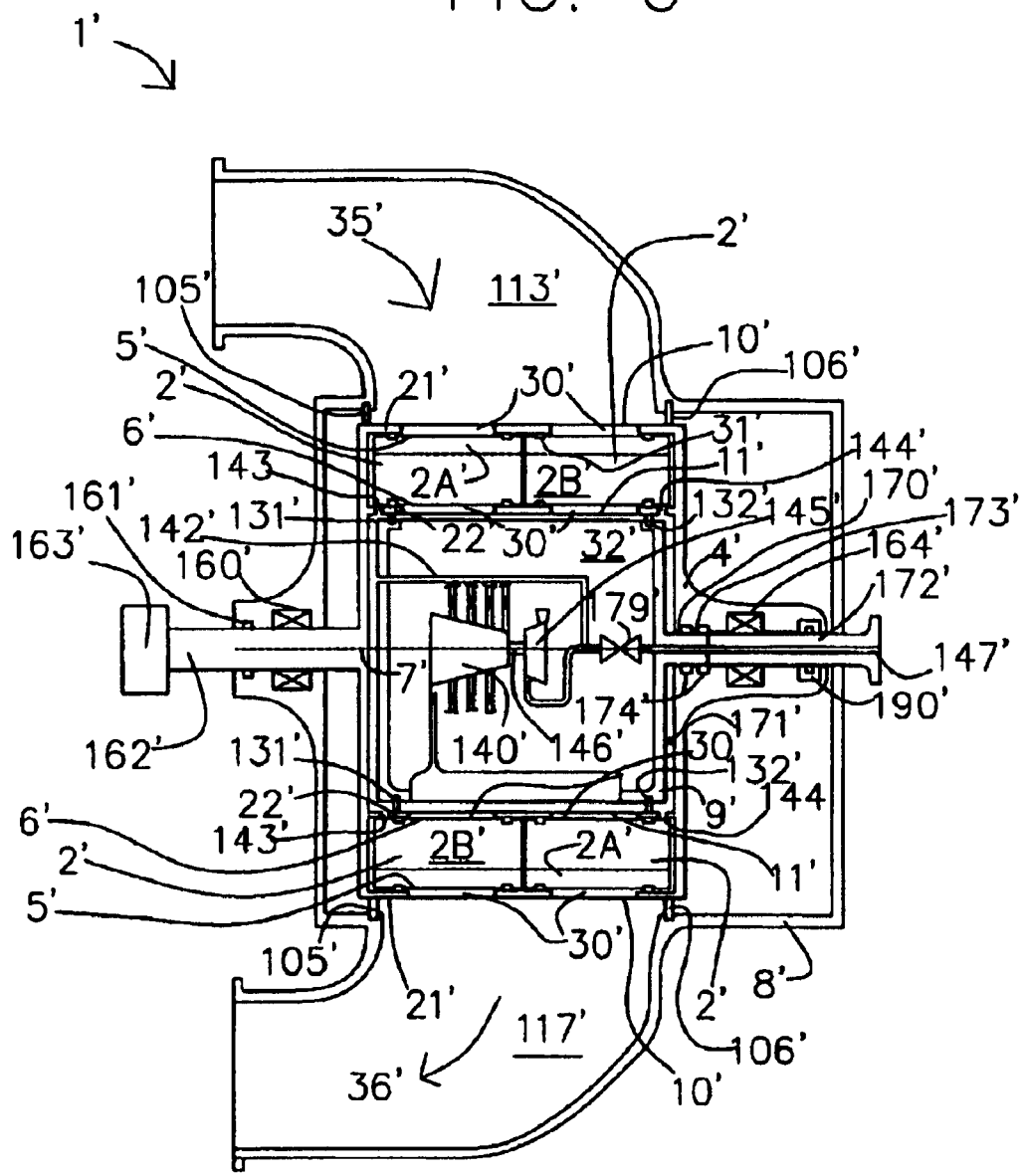
FIG. 6 is schematic cross sectional view of a rotary, radial flow PSA module.

FIG. 5A shows the second stator valve face 120 of the second stator 9 in the second valve face 11, in the plane defined by arrows 16–17 of FIG. 1. Open ports of the valve face are second valve function ports communicating directly to: a light product delivery compartment 121; a number of light reflux exit compartments 122, 123, 124 and 125; and the same number of light reflux return compartments 126, 127, 128 and 129 within the second stator. The second valve function ports are in the annular ring defined by circumferential seals 131 and 132. Each pair of light reflux exit and return compartments provides a stage of light reflux pressure letdown, respectively for the PSA process functions of supply to backfill, full or partial pressure equalization, and cocurrent blowdown to purge. The light reflux to purge fluid can be drawn from any of the light reflux ports 122, 123, 124, or 125. This embodiment illustrates the supply purge loop from port 124 to port 126. One-way valve 141 is used to ensure that no reverse flow, potentially containing contaminants, will occur. This figure shows the simpler alternative of using a series of throttle orifices 150 as the pressure letdown means and process control means for each of the light reflux stages.

Guard traps (desiccant traps in this example) 135 and 136 respectively may be installed within the light product delivery conduit 147 and each light reflux loop conduit, such as conduit 134. The guard traps must have provisions for replacement or regeneration as continuous use may saturate the trap with contaminants, and possibly release contaminants. Some embodiments are discussed in a later section.

Figure 5B:
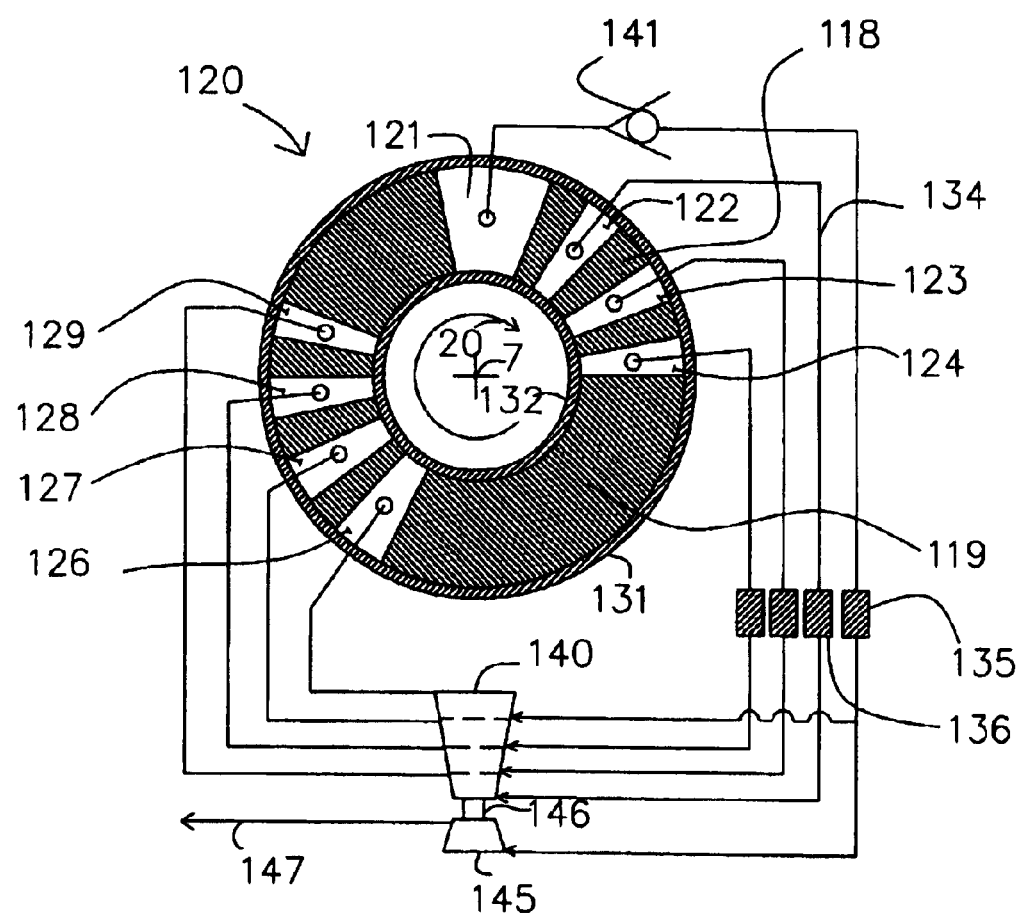

FIG. 5B illustrates the option of light reflux pressure letdown with energy recovery, where a split stream light reflux expander 140 is provided to provide pressure letdown of four light reflux stages with energy recovery. FIG. 5B also illustrates the option of providing product gas as the purge fluid. The light reflux expander serves as pressure let-down means for each of four light reflux stages, where the stages have a light reflux loop conduit 134 respectively between light reflux exit and return compartments 122 and 129, 123 and 128, 124 and 127, and 121 and 126 as illustrated.

Light reflux expander 140 is coupled to a light product pressure booster compressor 145 by drive shaft 146. Compressor 145 receives the light product from port 121 and delivers it (compressed to a delivery pressure above the higher pressure of the PSA cycle) to delivery conduit 147. For oxygen enrichment over nitrogen-selective zeolites, the light reflux and light product are both enriched oxygen streams of approximately the same purity. As a result, expander 140 and light product compressor 145 may be substantially hermetically enclosed in a single housing, which conveniently may be integrated with controls on the second stator as shown in FIG. 1. This configuration of a "turbo compressor" oxygen booster without a separate drive motor is advantageous, as a useful pressure boost of the product oxygen can be achieved without an external motor and corresponding shaft seals, and can also be very compact when designed to operate at very high shaft speeds.

Turning back to FIG. 1, relatively higher pressure feed air is supplied to compartment 113 as indicated by arrow 35, while nitrogen enriched heavy product is exhausted from compartment 117 as indicated by arrow 36 at the relatively lower pressure. The rotor is supported by bearing 160 with shaft seal 161 on rotor drive shaft 162 in the first stator 8, which is integrally assembled with the first and second valve stators. The adsorber rotor is driven by motor 163.

In this embodiment, circumferential seals 105 and 106 and shaft seal 161 are the primary seals, as defined above. The process containment seals are circumferential seals 131 and 132. A buffer space is defined by seal 106, clearance gap 13, space 171 and seal 131. The buffer seal 170 provides for two buffer chambers, clearance gap 13 and buffer chamber 171. Buffer chamber 171 can be filled with any contaminant-free fluid, and preferably by the product fluid, as illustrated. The chamber 171 can be filled with gas to a buffer pressure positively above ambient pressure, such as about 20 kPa above ambient or greater. A preferred embodiment is to design buffer chamber 171 so as to provide for a flowing buffer gas to ensure that any contaminants will not collect in the buffer chamber. The channel 176, which is preferably close to seal 131, is sized to allow all product flow to pass though without a substantial pressure drop, and pass through chamber 171. Also, a preferred embodiment is to design the flowing buffer gas path in a manner that the net flow of buffer gas is in the opposite direction of potential contaminant leakage, as shown by arrow 177. Hence, minor leakage of dry oxygen outward may take place, but humid air may not leak into the buffer chamber. In order to further minimize leakage and to reduce seal frictional torque, buffer seal 170 seals on a sealing face 172 at a relatively small diameter that minimizes the circumferential length of buffer seal 170. Buffer seal 170 seals between a rotor extension 175 of adsorber rotor 4 and the sealing face 172 on the second valve stator 9, with rotor extension 175 enveloping the rear portion of second valve stator 9 to form buffer chamber 171. Buffer seal 170 may be designed to have relatively light engagement for low friction and wear while the PSA unit is under normal operating conditions of rotation and pressurization, and then to engage tightly on its sealing face as a parking seal when the PSA unit is shut down.

A separate parking seal 190 also may be provided as a separate sealing element, and engaged only during shut down. FIG. 1 illustrates a parking seal 190 not engaged, i.e., during normal operation. Parking seal 190 is actuated upon shut down, such as fluid pressure or electrical actuation with a spring closing the seal when lack of the aforementioned signal is detected. The parking seal may have the capability of creating a tight fluid seal between the clearance gap 13 and the buffer seal 170, thereby ensuring that contaminants cannot pass into the buffer chamber 171 and then into the adsorbers. The parking seal is in contact with both the adsorber rotor 4 and the stator assembly 12 when engaged. The product oxygen from light product functional compartment 121 is delivered by channel 176 into buffer chamber 171, and after circulation through chamber 171 is delivered by conduit 177 to product booster compressor 145 or else directly to product delivery conduit 147. A stator-housing member 180 is provided as structural connection between first valve stator 8 and second valve stator 9.

FIGS. 1A to 1D are simplified drawings used to clearly show different contaminant ingress resistance schemes. They are not intended to show the full function of the rest of the PSA apparatus. FIG. 1A shows a variation of the buffer seal placement relative to FIG. 1. Here, feed enters as arrow 35 into a first end 5 of adsorber 3, and product exits end 6, as per arrow 37, while exhaust is withdrawn in direction of arrow 36. The buffer seal 170" is placed concentrically around the primary seal (outer circumferential seal) 106, and the space between is now vented to the exhaust via buffer vent 179. The product exits adsorber end 6 past process containment seal 131 and 132, and travels through the clearance gap 13" to the product outlet port fluidly attached to product conduit 147 via check valve 181 and valve 202. The direction of product flow is again counter to any expected direction of contamination, and, in this embodiment, may have a relatively high velocity if the clearance gap is narrow. The clearance gap is lined with guard materials acting as a continuous guard trap 178 for contaminants, while being constantly regenerated by the very clean product gas.

Figure 1B:
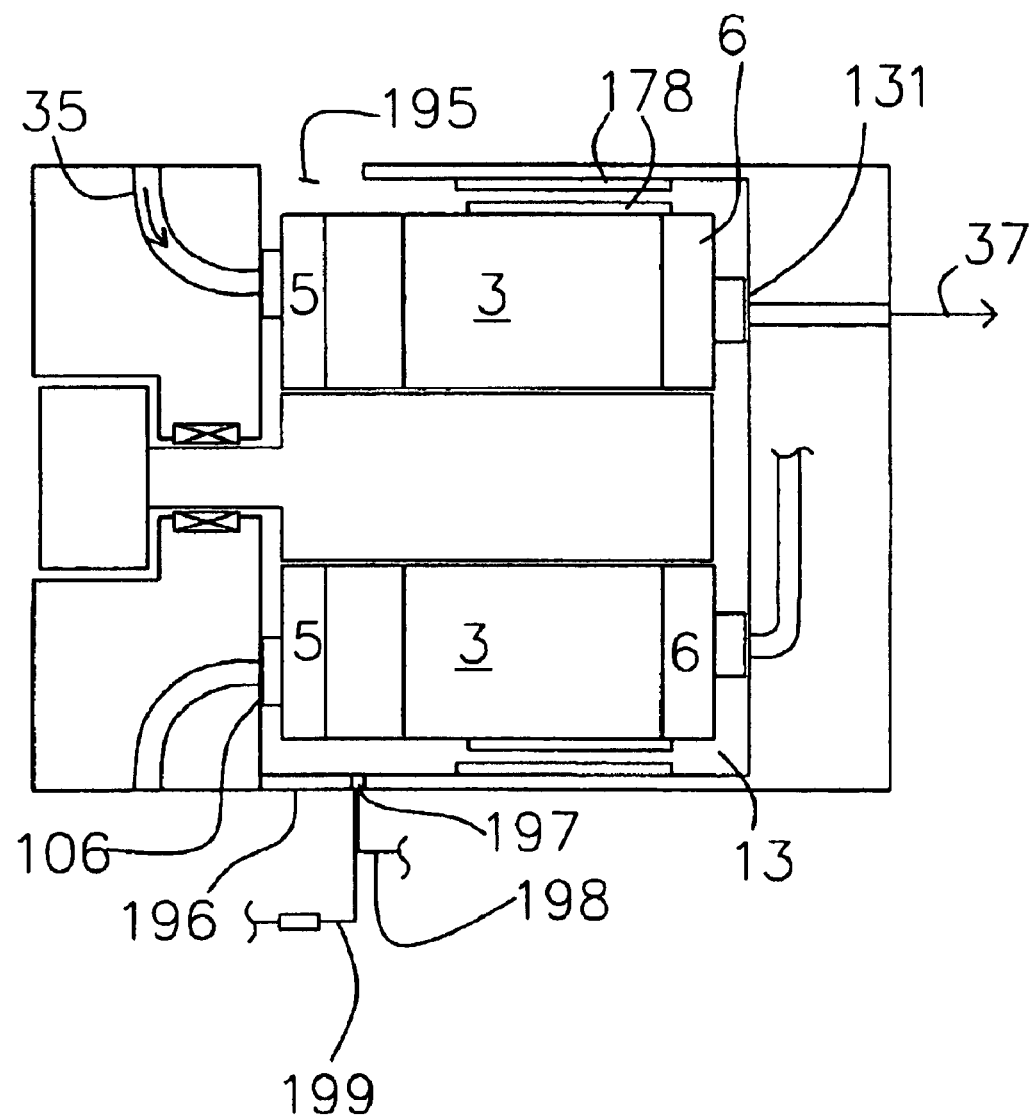
FIG. 1B is another embodiment of a rotary, axial flow PSA module.

FIG. 1B shows other variations of the dynamic sealing arrangement for rotary bed systems. Here, feed enters as arrow 35 into the first end 5 of adsorber 3, and product exits end 6, as per arrow 37. The product containment seal 131 is also acting as the primary seal, as clearance gap 13 is open to atmospheric conditions through gap 195. A preferred embodiment for this configuration (where there is no buffer space) is to use guard trap 178 in the path of contaminant-laden fluids to the process containment seal.

Another variation shown in FIG. 1B is where the gap 195 is replaced by continuous housing 196. In this arrangement, seal 131 is the process containment seal, and the primary seal is seal 106, where these two seals define a buffer space and buffer chamber 13. Preferentially, a pressure equalizer port 197 is installed to limit any pressure difference from ambient. The port 197 can communicate with ambient via breather 198, and preferably through breather 198 and guard trap 199.

Figure 1C:
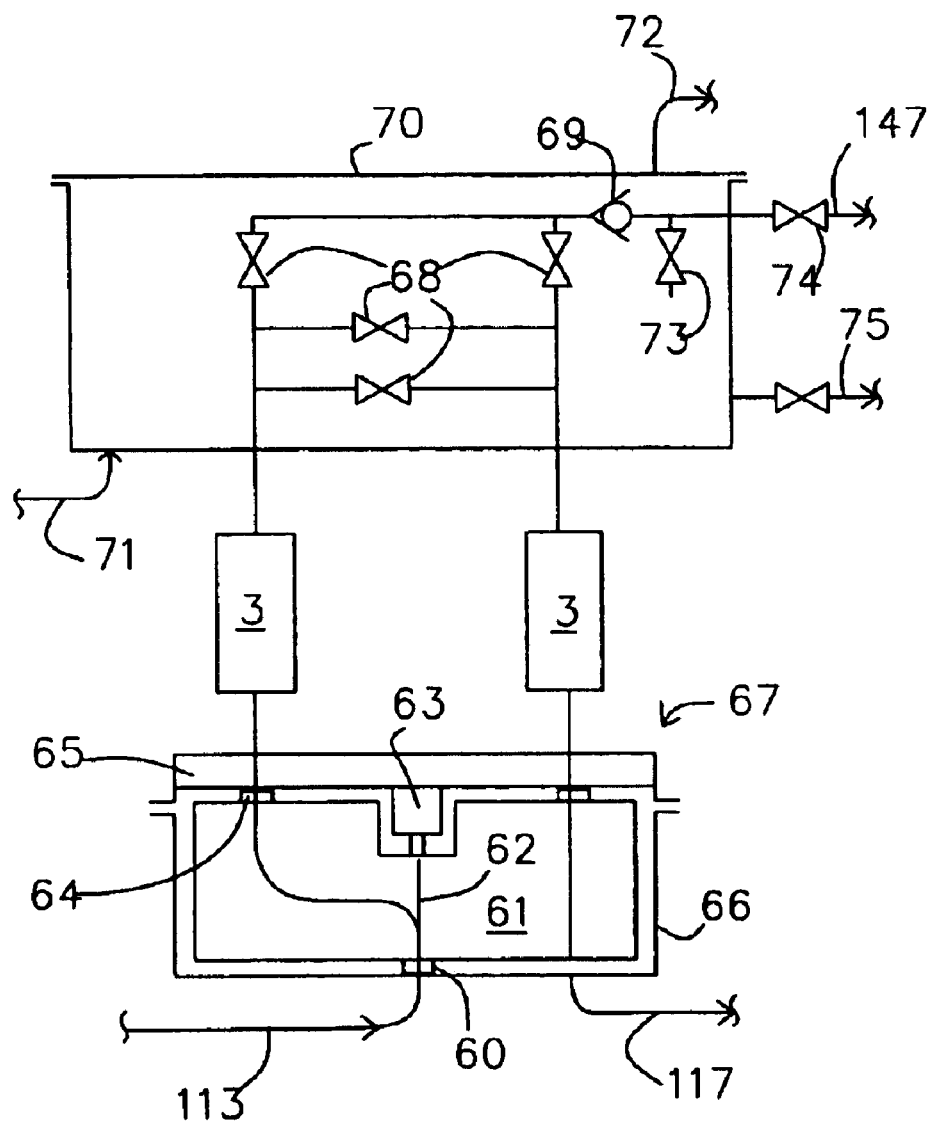
FIG. 1C is a schematic cross section of a stationary bed rotary PSA.

FIG. 1C depicts a stationary bed system, where the feed ends of adsorbers 3 use a rotary valve to synchronize flows. The light product end uses some valve switching in order to affect a PSA process. Feed gas is transported via conduit 113 to heavies valve 67, through dynamic seal 60 and rotor body 61, rotating about axis 62 by motor 63. Feed flow is directed to seal 64 and through stator housing 65 to adsorber 3. Exhaust gases are directed from adsorber 3 through stator housing 65, seal 64, and rotor body 61. The fluids are contained by second stator housing 66 in coordination with stator housing 65, and withdrawn via conduit 117.

The light product end of the adsorbers 3 are depicted as conventional conduit with directional valves 68 used to provide synchronized pressure and flow cycling in coordination with the feed end valve 67, and the adsorbers 3, with the product fluid being delivered by product conduit 147. Note that this drawing depicts only the simplest 2-adsorber PSA and that it represents all PSA configurations with a rotary feed valve and conventional valve arrangements for the light product end fluids. The light product end system is completely enclosed in an impermeable container 70, where tight fluid sealing is achieved across the whole boundary. In this option, atmospheric borne contaminants are not able to enter into the process across the valve stem actuators, which are the process containment seals. The static buffer space (the space around the valves bounded by static sealing) is preferably filled with a buffer fluid, introduced by a buffer fluid supply leading to port 71. A positive pressure gradient over the ambient pressure is a preferred option. This buffer fluid is also preferably circulated and refreshed by allowing the fluid to be withdrawn by port 72.

One way valve 69 can be used to minimize reverse flow of any contaminant coming from down stream equipment or processes, as well as the preferred option of using product gas as the buffer fluid by closing valve 74 and allowing the product fluid to enter container 70 via valve 73, and to allow the product to be withdrawn from the container 73 through product conduit 75.

Figure 1D:
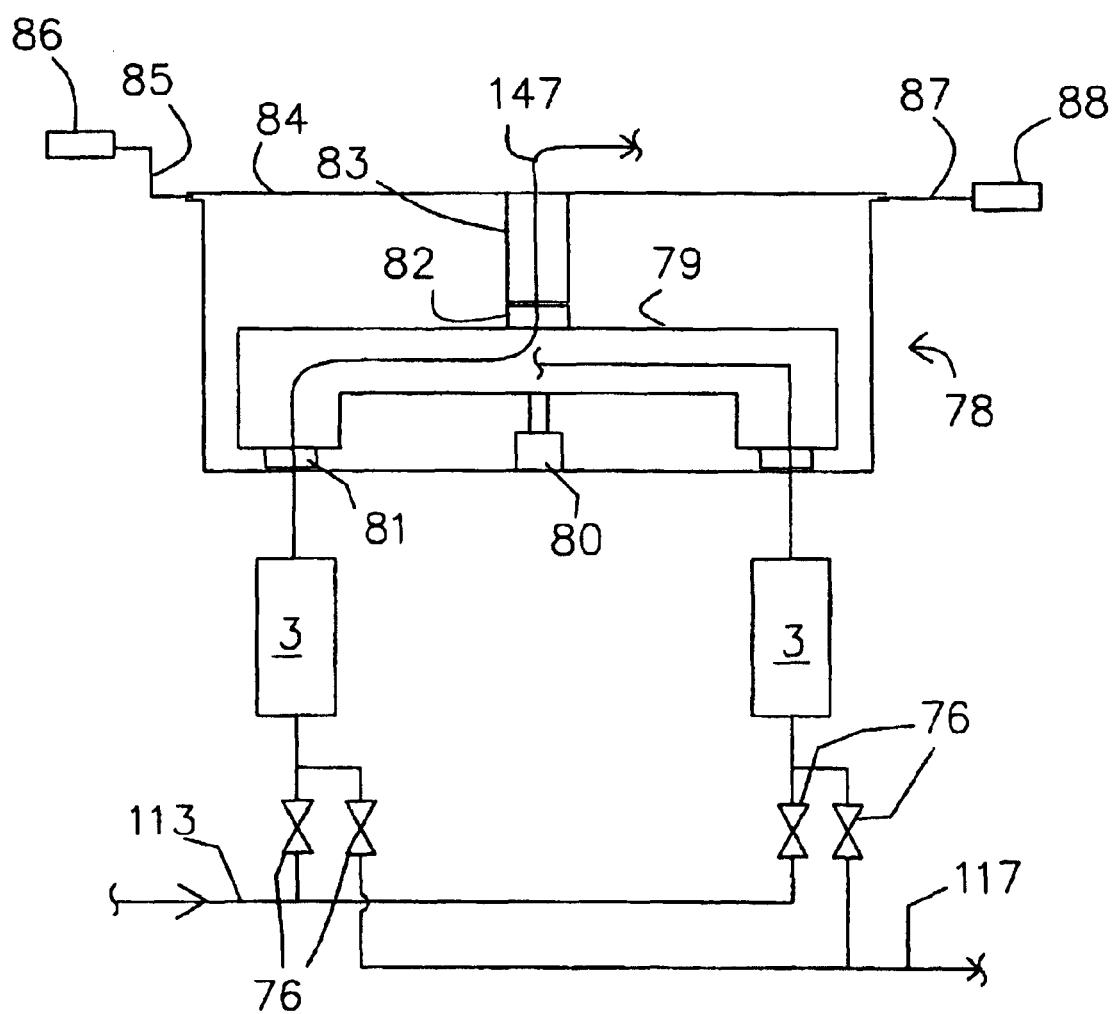
FIG. 1D is a schematic cross section of a stationary bed rotary PSA.

FIG. 1D also depicts a rotary PSA system, wherein the light product end of adsorbers 3 uses a multi-port rotary distributor valve to synchronize pressure and flow cycles. The lights valve 78 contains a rotor 79 being rotated by motor 80, and where dynamic seals 81 communicate with the adsorbers 3 in a cyclic manner. Feed gas is allowed in conduit 113 to a set of directional valves 76, and is then directed to one of the adsorbers 3, where product gas is drawn off through seal 81, through lights rotor 79, and into product conduit 147 via dynamic seal 82 and product port 83. The dynamic seals 81 and 82 are process containment seals, and in the configuration where lights valve housing 84 is not sealed, they are also the primary seal, and have the least amount of resistance to contaminant ingress from the surrounding atmosphere. In one option, the housing 84 can be sealed, in order to create a static buffer space that can be protected as discussed above. Another option is to allow the static buffer chamber to breathe through breather 85 coupled to blanket gas supply 86. Another preferred option is to allow the static buffer chamber to breathe through breather 87, and preferably through guard trap 88. Exhaust gases are withdrawn from adsorber 3 via directional valve 76 and through conduit 117.

A combination of devices shown in FIGS. 1C and 1D, such as heavies valve 67, coupled to adsorbers 3 and to lights valve 78 is also considered a rotary PSA and is able to benefit from the invention. A system consisting of the light product end valves 68 with associated conduits, along with adsorbers 3 and first end valves 78 and associated conduits consist of conventional PSA, and can be seen to also benefit from the invention.

FIG. 6 illustrates a rotary, radial fluid flow PSA apparatus well suited for a large scale oxygen production module and, as stated above, features described for rotary, axial fluid flow PSA systems are applicable to radial flow systems. With reference to FIG. 6, module 1' includes a number "M" of adsorber elements 2' located in the same angular position, and cooperating in parallel to form "N" adsorbers in adsorber housing body 4'. In this embodiment, M/N equals 2, as there are two elements shown on the cross section of module 1'. Each adsorber element 2' has a first end 5' and a second end 6', with a flow path therebetween contacting a nitrogen-selective adsorbent. Each adsorber element has an impervious surface surrounding it except where the first and second ends 5' and 6' are. Each element is sealed to the adsorber housing body 4' by element seals 31' in a manner that the process fluid is not able to bypass the flow path defined by first and second ends 5' and 6' respectively. Each adsorber has a first zone 2A' adjacent its first end, and a second zone 2B' extending to the second end. First zone 2A' contains a guard layer, such as activated alumina, activated carbon, or a zeolite adsorbent, and second zone 2B' contains a contaminant-sensitive adsorbent as described herein. Typically, zone 2A' extends over about 20% of the adsorber length between the first and second ends, and zone 2B' (which may in turn be subdivided into a plurality of zones containing different adsorbents) is the remaining 80%.

The adsorbers are deployed about the adsorber housing body 4', which is relative rotary motion about axis 7' with first and second valve bodies 8' and 9'. In this embodiment the adsorber housing body 4' is rotating around second valve body 9', is supported by bearings 160' and 164', and is driven via shaft 162' by motor 163'. A shaft seal 161' is used.

Housing body 4' is engaged across a first valve surface 10' with the first valve body 8', to which feed air is supplied and from which heavy product is withdrawn. Feed fluid is supplied by conduit 113' in the direction of arrow 35', and exhaust gas is withdrawn by conduit 117' in the direction of arrow 36'. These fluids are contained by first and second outer circumferential seals 105' and 106' respectively.

And, housing body 4' is engaged across a second valve surface 11' with the second valve body 9', from which a fluid, such as oxygen-enriched fluid, is withdrawn as the light product. The process fluids are contained by first and second inner circumferential seals 131' and 132' respectively.

Illustrating the option of light reflux pressure letdown with energy recovery coupled to a product compressor, a split stream light reflux expander 140' may be coupled to a light product pressure booster compressor 145' by drive shaft 146'. Compressor 145' receives the light product and delivers it (compressed to a delivery pressure above the higher pressure of the PSA cycle) to delivery conduit 147.

In this embodiment, the adsorber elements are contained within the outer wall 21' and the inner wall 22'. The ports 30' go through these walls and are in fluid connection with the adsorber element ends. Product is delivered into product chamber 32' via certain ports 30', and then collected by the product compressor 145'. The remaining light reflux lines are preferably fully bathed by the product fluid. This ensures that any contaminants cannot enter into the light reflux conduits.

A portion of the compressed product is taken off of line 147' by line 142' and delivered to port 143' which is a through port into the area bounded by the inner and outer walls 21' and 22' respectively. Valve 179' is used to regulate the flow mix between line 142' and 147'. The contaminant-free product fluid is circulated through the volumes between the adsorber elements to collect any contaminants that can bypass the element seals, and is then delivered through port 144' into a buffer chamber 171'. The buffer chamber is bounded by buffer seal 170', which is a clearance-type dynamic seal. The buffer fluid then enters a chamber 174' which is designed to sweep around the shaft and exit through seal 173', which is a second buffer seal. The gas is further sent to a third buffer chamber for sweeping fluid around the shaft, and thence to join the remaining product fluid in 147'. Seal 173' and the primary seal (second outer circumferential seal) 132' (and by adsorber housing 4' and second valve body 9') define the fourth buffer chamber.

As with the previous embodiment, the buffer chamber is designed to direct the buffer gas, with smooth flow to avoid contaminant collection, in the direction opposite to the direction of potential contaminant flow, here towards buffer seal 170'. The buffer seal in this embodiment is designed as a narrow gap with a high flow rate, around a relatively small diameter. There is a provision for entraining some or all of the product to flow through the thin gap. The thin gap provides for high gas velocities to minimize the ability of contaminants to travel in the opposite direction. The flow is then sent back to product line 147' for final delivery.

A parking seal 190' is utilized for sealing the buffer chamber while the unit is parked. It is placed between the buffer seal 173' and the primary seal 132'.

B. FIGS. 7–16

In the following figures of this disclosure, simplified schematics will represent the exemplary PSA apparatuses described above. These highly simplified drawings will indicate just a single feed conduit 181 to, and a single heavy product conduit 182 from, the first valve surface 10; a single compressor 101 with feed conduit 100 and a single exhauster 103 with delivery conduit 104, and the need to operate at least one of these compressors; and the light product delivery conduit 147 and a single representative light reflux stage 184 with pressure let-down means communicating to the second valve surface 11. FIGS. 7–16 may be taken to include PSA embodiments with rotary adsorbers, PSA embodiments with rotary distributor valves and stationary adsorbers, and for greatest generality other PSA devices with any type of directional valve mechanism and any number of stationary or moving adsorbers.

The adsorbers 3 (with guard layer 3A and adsorbent layer 3B) are contained within an adsorber compartment 200 (shown by dashed lines in FIGS. 7–16) shown rotating around axis 7. The thermal regime of compartment 200 is important in some of the embodiments disclosed hereunder. Adsorber compartment 200 may also enclose some or all of the PSA process valving and process logic, with no limitation of the mechanical manifestation of the adsorbers. Compartment 200 may be simply an area under a given thermal regime isolated from the external ambient to some extent, or it may be physically contained to provide isolation from the external contaminant-laden atmosphere as a general approach to protect the PSA system against contaminant ingress by any pathway.

The following embodiments provide solutions for contaminant management with sensitive adsorbents under normal operation, start-up and shutdown procedures and parked condition of the PSA unit. While the discussion will focus on the important application to oxygen enrichment over nitrogen-selective adsorbents which are especially water-sensitive, it will be appreciated that the features of the invention are broadly applicable to any PSA device and process for separating any gas mixture (or purifying any gas component) over adsorbent which may be deactivated or otherwise degraded by contact with a contaminant either introduced within the PSA unit as part of its process duty, or else just externally contacting the PSA unit.

Figure 7:
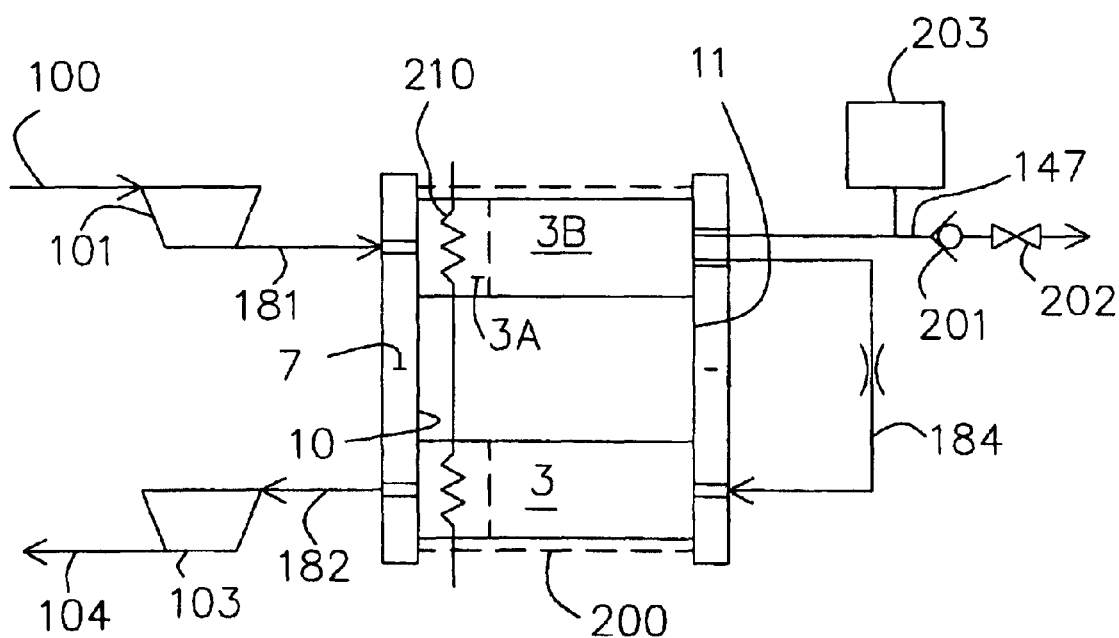
FIGS. 7 through 16 show a simplified and generalized schematic of fast cycle PSA modules with devices for preventing or inhibiting deactivation of the water-sensitive adsorbent zone.

FIG. 7 shows a non-return valve 201 and a shutoff valve 202 deployed in series in product delivery conduit 147, so as to positively prevent back-migration of water from the product receiver or consumer when the PSA unit is shut down.

FIG. 7 further shows a light product storage vessel or surge chamber 203, which communicates with conduit 147 and which provides a volume of dry light product gas as shutdown purge gas for partial regeneration of the desiccant adsorber zone 3A upon depressurization and shutdown of the PSA unit. It is most desirable to keep the rotor or rotary valve turning during purge, so all adsorbers are purged equally. Vacuum pump 103 may be operated so as to increase the degree of regeneration of desiccant zone 3A that can be achieved with a finite volume of purge gas from receiver 203.

FIG. 7 also shows the compartment 200 as an insulated unit, which can also be used to minimize the thermal variations in the apparatus, to reduce the tendency for the adsorbers to breath. The purge vessel 203 is also, in certain embodiments, used to provide blanket fluids to the PSA, can be used as a source of fluid for a product end breather and can further be conditioned to provide blanket fluids that reduce temperature variations in the adsorbers.

FIG. 7 also shows a guard layer heater device 210, which is used to heat the guard layer 3A for enhanced regeneration during shutdown purging from surge chamber 203. Heater device 210 may generally use any technique for localized heating. Alternative suitable heater devices may be based on electrical resistance heaters embedded on adsorber zone 3A, or on infrared radiation, or microwave radiation. As some preferred embodiments of the adsorbent laminate use wire mesh screens or metal foils as the adsorbent sheet support, inductive eddy current heating is also a viable heater device approach within the invention. Localized heating may also be achieved by increasing the load on rotary valve seals at valve surface 10. Heating can also be affected by heating the purge gases by operating the vacuum pump and/or compressor in a recirculation mode so as to heat the adsorbers, or by heating the purge gas through a heat exchanger (not shown).

Figure 8A:
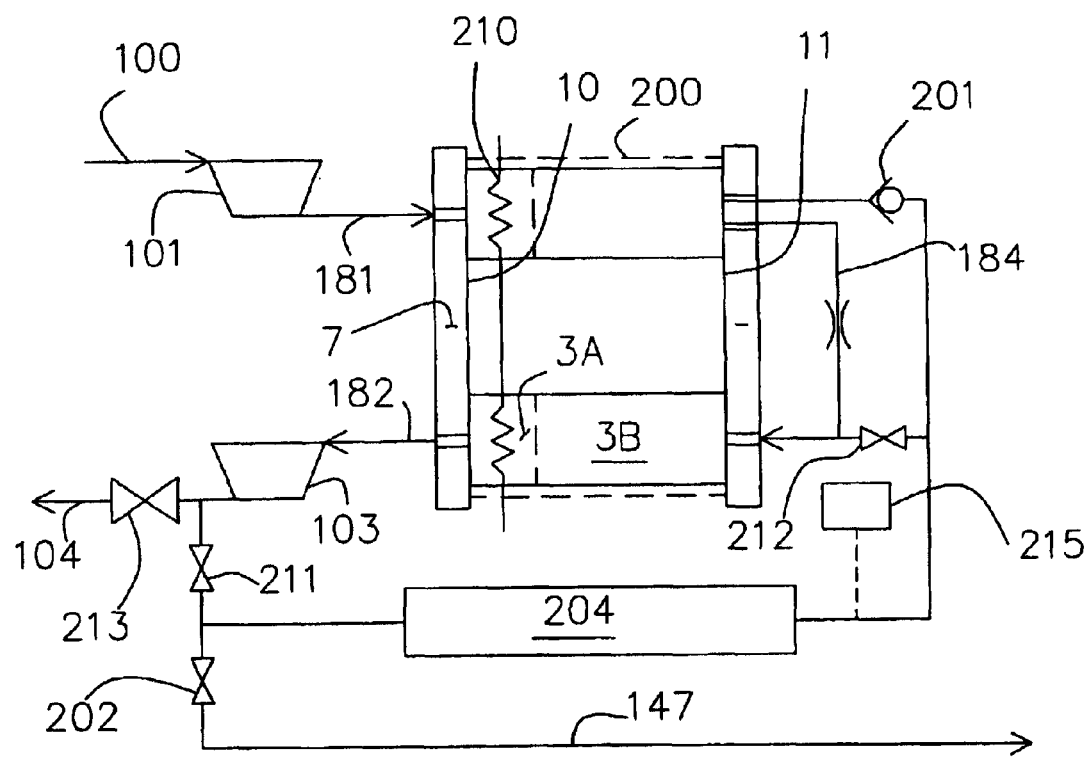

FIG. 8A shows an embodiment for extended back purge of the desiccant, by using the vacuum pump 103 for recirculated purge (preferably by the lights product) through a guard trap 204, which will be regenerated in subsequent normal operation by dry product and/or thermal swing. The operating principle of this embodiment is to achieve substantially complete regeneration of the guard layer 3A, by displacement purge to transfer the adsorbed contaminants from the guard layer to the guard trap 204. Guard trap 204 must be large enough in contaminant capacity to adsorb substantially all the contaminant desorbed from the guard layer, without any breakthrough of water vapor that would contaminate the water-sensitive adsorber zones 3B from the product end. Auxiliary directional valves 211, 212 and 213 are provided to enable the shutdown regeneration procedure. During normal operation, valve 213 is open, and valves 211 and 212 are closed, so that the vacuum pump discharges to atmosphere, while the dry oxygen-enriched product gas passes counter-currently through guard trap 204 to regenerate it. During the shutdown regeneration procedure, valve 213 is closed while valves 211 and 212 are open so that the vacuum pump recirculates purge gas via valve 211 co-currently through guard trap 204 and then through valve 212 back to purge adsorbers 3 counter-currently from the product end. A heating method, as discussed above, is preferably operating during the regeneration phase. A contaminant sensor 215 may be provided as a safety device to warn of any contamination breakthrough that could deactivate the adsorber zones 3B, and desirably to trigger an automatic shutdown by closing valve 212 and stopping exhauster 103.

Figure 8B:
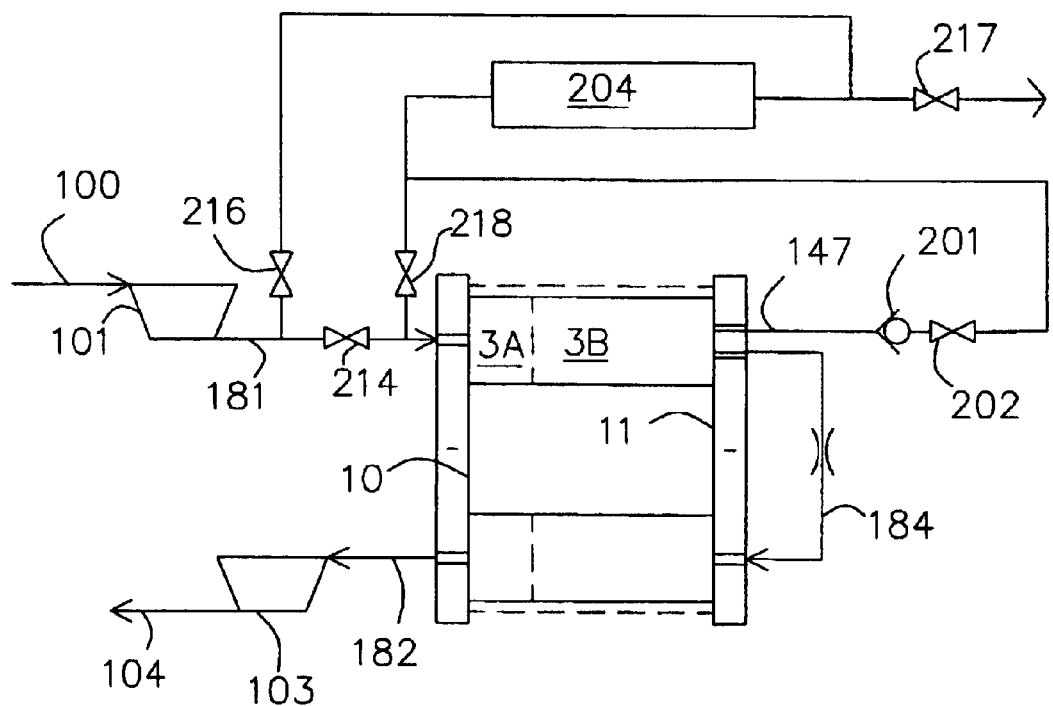

FIG. 8B shows a variation of the process shown in FIG. 8A. Under normal operation, auxiliary directional valves 214, 202, and 217 are open, while auxiliary directional valves 216 and 218 are closed. Feed gas is delivered via conduit 181, through valve 214, and product gas passes counter-currently through the guard trap 204 to regenerate it. During the shutdown regeneration procedure, valves 214, 202 and 217 are closed while valves 216 and 218 are open so that the compressor provides feed purge gas via valve 216, co-currently through guard trap 204, and then through valve 218 back to purge guard layer 3A co-currently from the feed end. Since the product flow is stopped, most of the feed gas will exit through the exhauster 103 via conduit 182 at the low regeneration pressure. Although the flow is bidirectional, the difference in the pressures will, per cycle, create a displacement purge effect. This purge method has the added benefits of heating the gas with compression work and by the heat of adsorption in guard trap 204 and delivering that heat directly to the guard layer, as well as safely introducing purge gas without going through the sensitive adsorbent zone 3B.

This variation of FIG. 8B can in fact be split into two stages. In the first stage, the product isolation valve 202 is closed, but valve 214 remains open. This operation provides wet purge gas to the guard layer, but due to no product being drawn, a relatively larger amount of feed contaminant will be exhausted, and the guard layer will become partially regenerated. When this operation has performed its value of partial regeneration, the second stage of having the guard trap in line with the feed purge gas takes place for complete regeneration. By splitting up the functions, the guard trap can be substantially smaller because there is less feed flow to clean out, which allows for faster regeneration during normal operation. As in the system shown in FIG. 8A, additional heating by heater 210 is an option, as well as using an in line heat exchanger to deliver heat to the gas stream in conduit 181.

Figure 9:
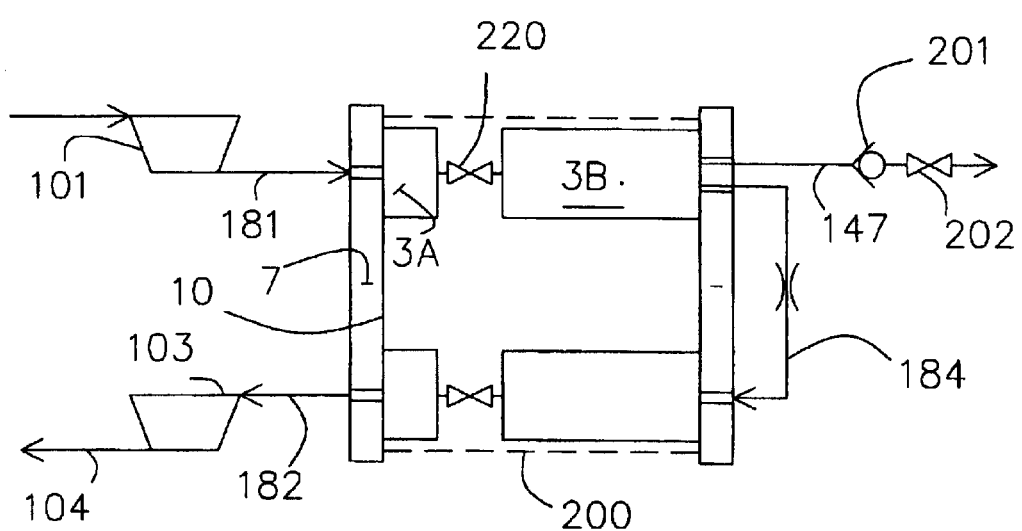
Figure 10:
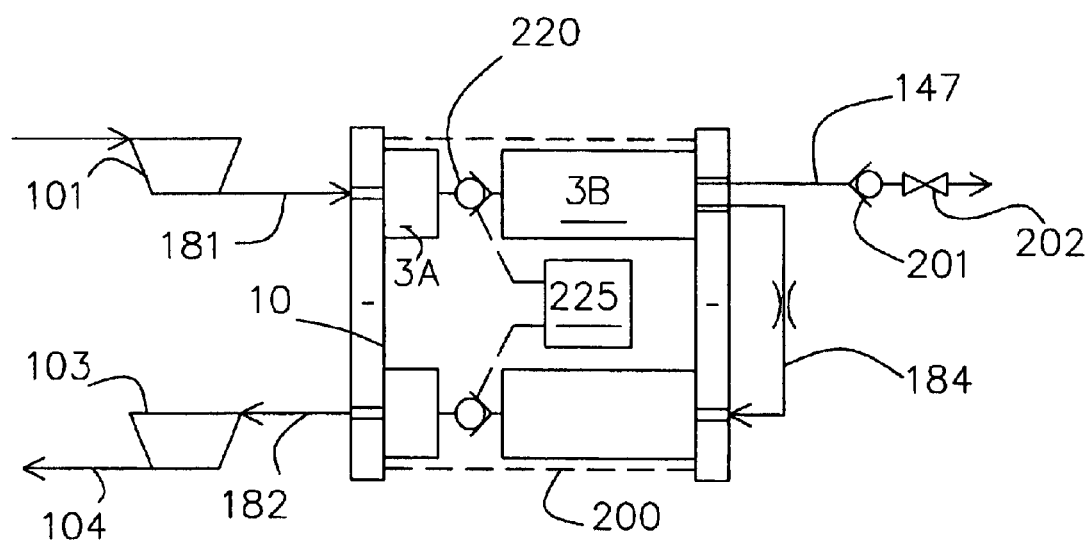
Figure 11:
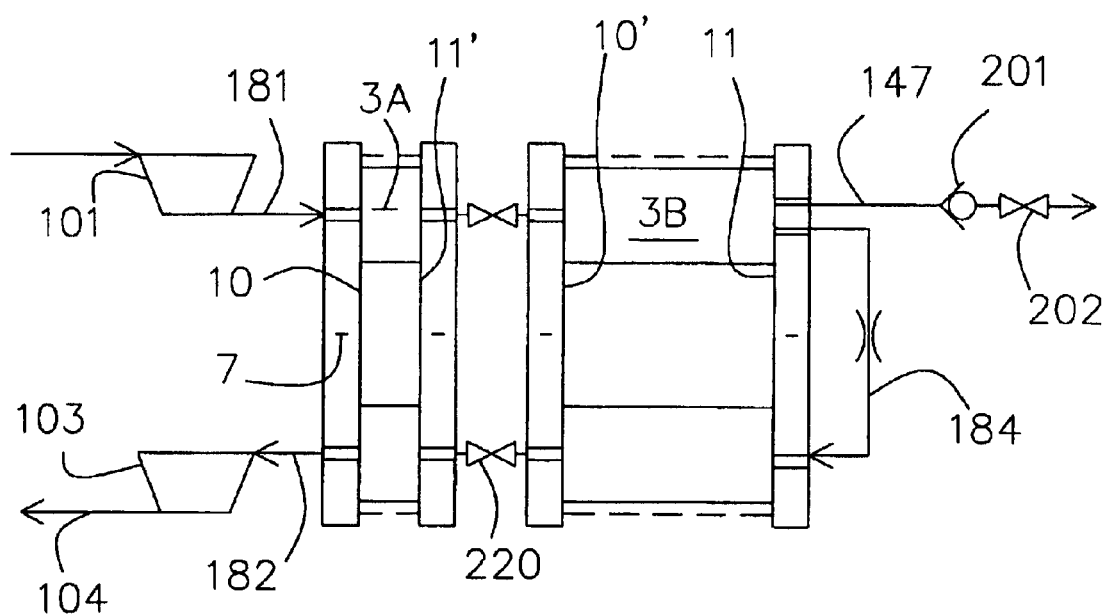

FIGS. 9–11 show isolation valves 220 between the desiccant and water-sensitive adsorber zones 3A and 3B. These valves along with light end parking seal must be absolutely tight and capable of withstanding maximum pressures due to temperature variations, otherwise we will be forcing ambient humidity ingress into adsorbers. FIG. 9 shows a two-way valve 220 between zones 3A and 3B of each adsorber, with valve 220 to be closed whenever the PSA unit is stopped. Valve 220 may be normally closed, and opened by rotation of a rotary PSA module or alternatively opened by generation of positive pressure from compressor 101, or by a signal that the system is in operation, such as electrical or pneumatic.

FIG. 10 shows each valve 220 as a check valve which prevents forward flow from zone 3A to zone 3B of each adsorber, except during normal intentional operation of the PSA module when check valve 220 is unseated by actuator 225, in turn energized by valve rotation or by compressor pressurization or by a signal that the system is in operation.

FIG. 11 shows the concept of isolation valves carried to the extreme of separating the PSA module into two stages with isolation valves 220 between the stages to be closed during shutdown. Here, the second stage is a PSA module with first valves 10' and second valves 11 cooperating with adsorbers 3B, which contain contaminant-sensitive adsorbent. Housings for individual components of a single PSA apparatus, or an entire PSA system, can be positively pressured during shutdown, and/or may include relatively dry fluid environments, such as may be provided by auxiliary dry fluid, or dry product fluid produced as a product of the PSA apparatus.

The first stage is a guard layer module, which may operate on a PSA cycle (at the same or a different cyclic frequency as the second stage PSA module) or alternatively could operate on a thermal swing adsorption (TSA) cycle. The first stage module has first valves 10 and second valves 11' cooperating with guard material layer 3A.

It will be evident that the water-sensitive adsorber zones 3B in each of the embodiments in FIGS. 9–11 must be isolated from the atmosphere during shutdown to prevent water vapor ingress.

Figure 12:
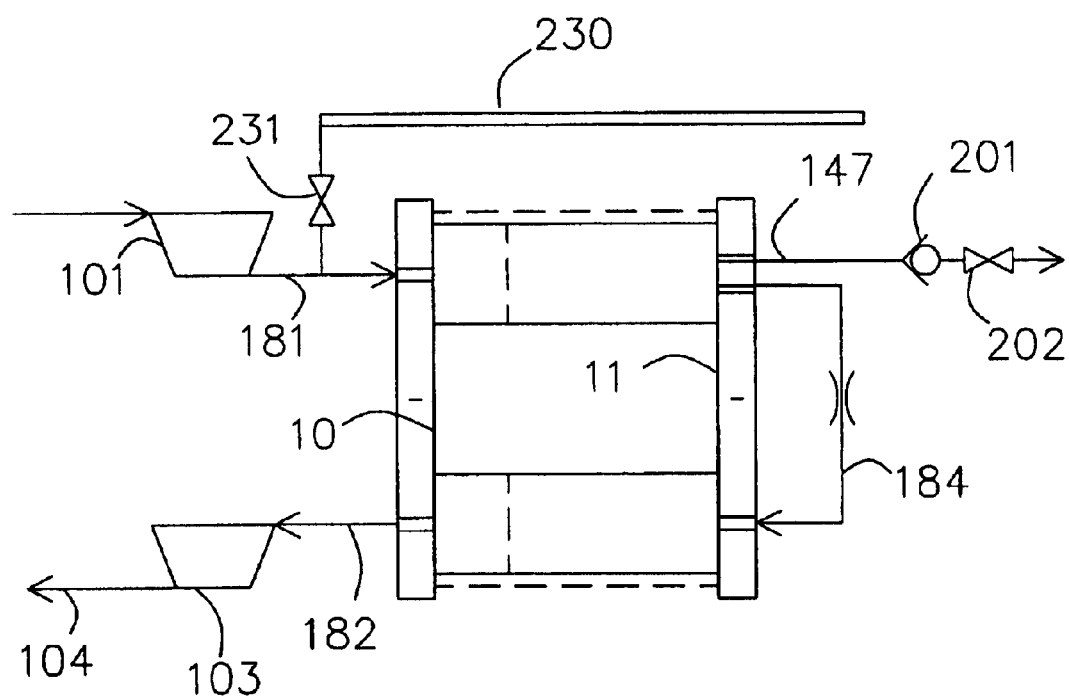
Figure 13:
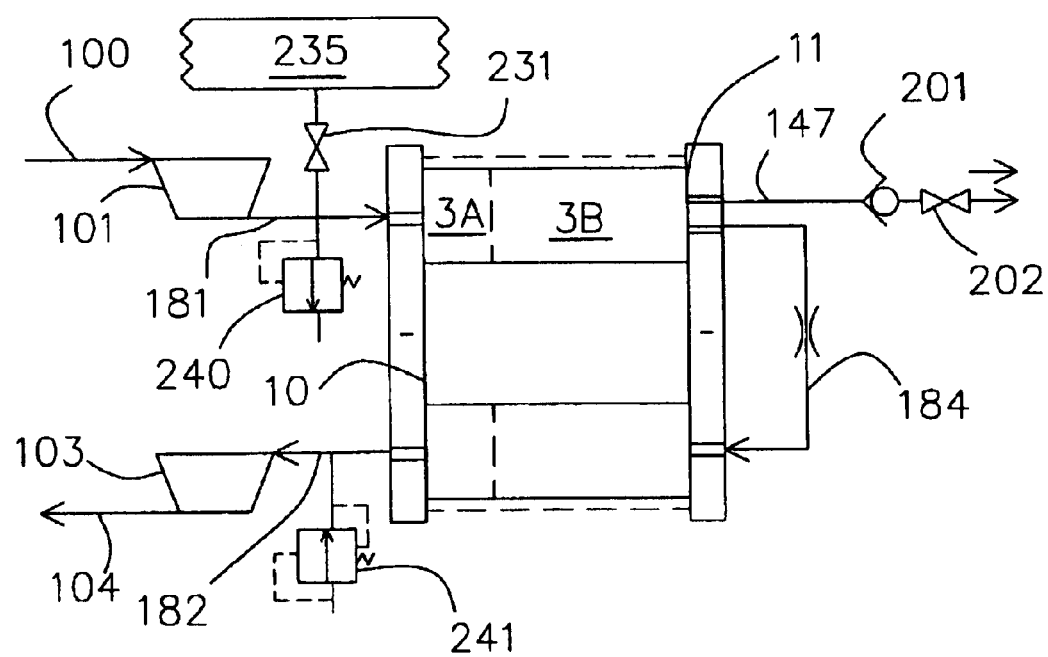
Figure 14:
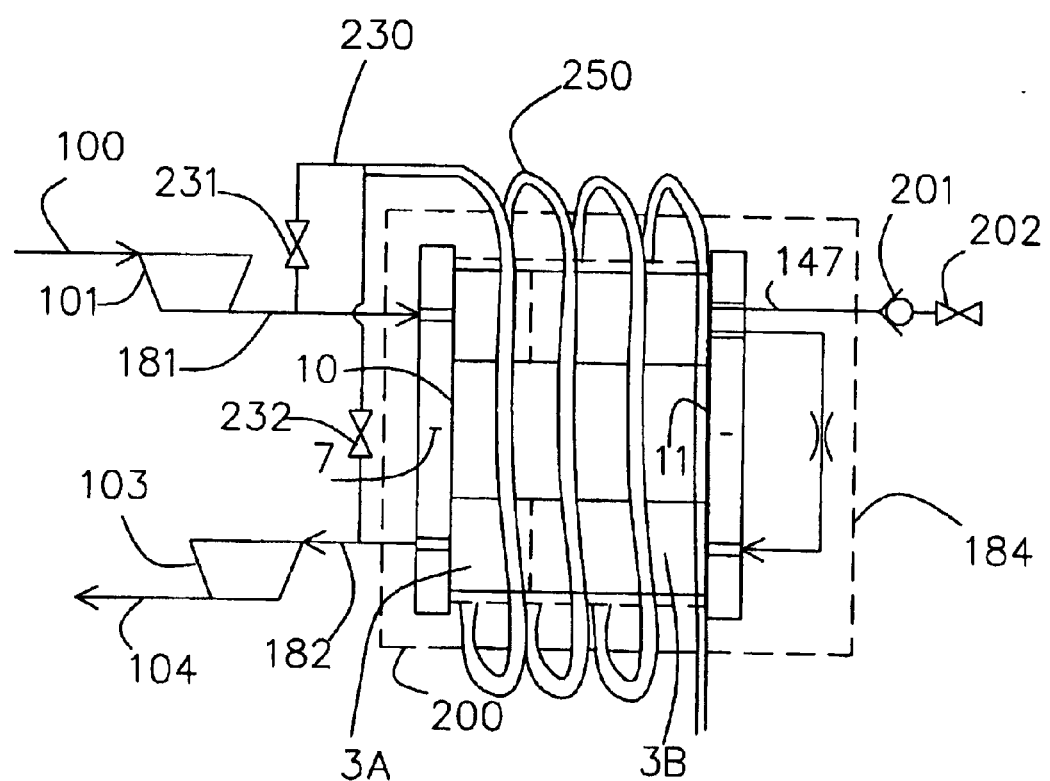

FIGS. 12–14 show air breather devices to allow approximate pressure equilibration between the external environment and the internal working spaces of the PSA unit. These devices can be used when there is no danger in mixing the outside atmosphere with the process gases. In general, this includes air separation and excludes hydrocarbon and hydrogen separation processes. By avoiding large pressure differentials, and by utilizing a tight fluid seal parking seal, the risk of humidity ingress into the product ends of the adsorbers is reduced. Therefore, the air breather device preferably communicates to the feed end of the adsorbers. Successful air breather devices will inhibit penetration of atmospheric water vapor into the adsorbers.

FIG. 12 shows an air breather provided as a long tube 230 without desiccant to retard bulk mixing of humid external air with dry oxygen in the adsorbers. Air breather 230 may be connected via shutoff valve 231 to adjacent the feed end of all the adsorbers in parallel. Valve 231 is closed during normal operation, but open during shutdown. If desired, valve 231 may be intentionally undersized to severely restrict gas flows through breather 230.

FIG. 13 shows an air breather provided as an inflated bag diaphragm 235 again communicating to the feed end of the adsorbers through shutoff valve 231. Diaphragm 235 enables approximate equilibration of the internal working space of the adsorbers with ambient pressure, but substantially prevents bulk mixing of humid external air with dry oxygen within the adsorbers.

FIG. 13 also shows a partly sealed shutdown. The PSA module is tightly sealed on oxygen ports, and fairly tightly sealed on feed ports. Crossover relief valves with a low cracking pressure setting are provided to permit limited feed end breathing only as required to prevent excessive pressure or vacuum build-up. Relief valve 240 enables external venting to relief over-pressure, and relief valve 241 enables internal venting to prevent excessive internal vacuum that could exceed structural limitations or at least increase the risk of water vapor ingress through minor leakage pathways into the product end of the adsorbers.

FIG. 14 shows an air breather with a guard trap 250 deployed in air breather 230 via valves 231 and/or 232 to the exhaust compartment, and externally to the PSA module which itself is in a relatively thermally more isolated zone 184 or compartment 200 having relatively less thermal contact to the external environment (or much greater thermal inertia) than the guard trap, so that ambient penetrate the guard trap 250 associated with the air breather very rapidly and penetrate the PSA module more slowly. Guard trap 250 may be configured as a continuous trap with guard materials along the full length, or as a set of discrete sections of guard materials within a continuous conduit, or as multiple guard traps with separate openings to atmosphere, and fluidly connected to breather 230. Guard trap 250 may be wrapped around a portion of compartment 200, or may even be arranged to be heated by ambient solar radiation that will then cause a fast temperature rise of guard trap 250 and much slower temperature rise within compartment 200, following by faster cooling of trap 250 compared to compartment 200.

Hence a phase shift is established between temperature swings in the air breather guard trap and air flows through to the adsorbers, as those airflows will be in phase with the rate of delayed temperature change within the adsorbers of the PSA unit. Airflow into the PSA unit occurs as it is cooling down, after the air breather guard trap has already cooled down so as to adsorb humidity more strongly. Airflow out of the PSA unit occurs as it is warming up, after the air breather guard trap has already warmed up so as to release adsorbed water vapor.

Consequently a thermal swing adsorption (TSA) process is established in the air breather desiccant bed, operative to slowly expel water out of the PSA unit on a 24-hour nominal cycle. This auxiliary TSA humidity expulsion process could have passive solar augmentation for extra thermal swing of trap 250. The air breather guard trap may be designed with a large volume and a long flow path to minimize the rate of nitrogen mixing into oxygen within the adsorbers.

Another option (not shown) is to configure conduit 181 or 182 as guard trap 250, thereby enabling a TSA process to respectively compression units 101 or 103.

Figure 15:
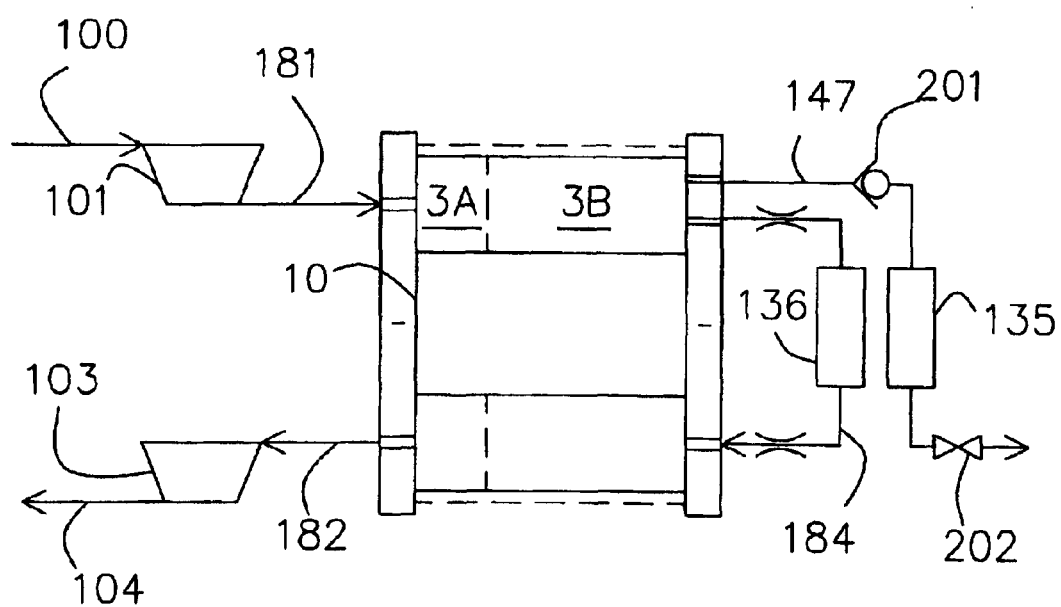
Figure 16:
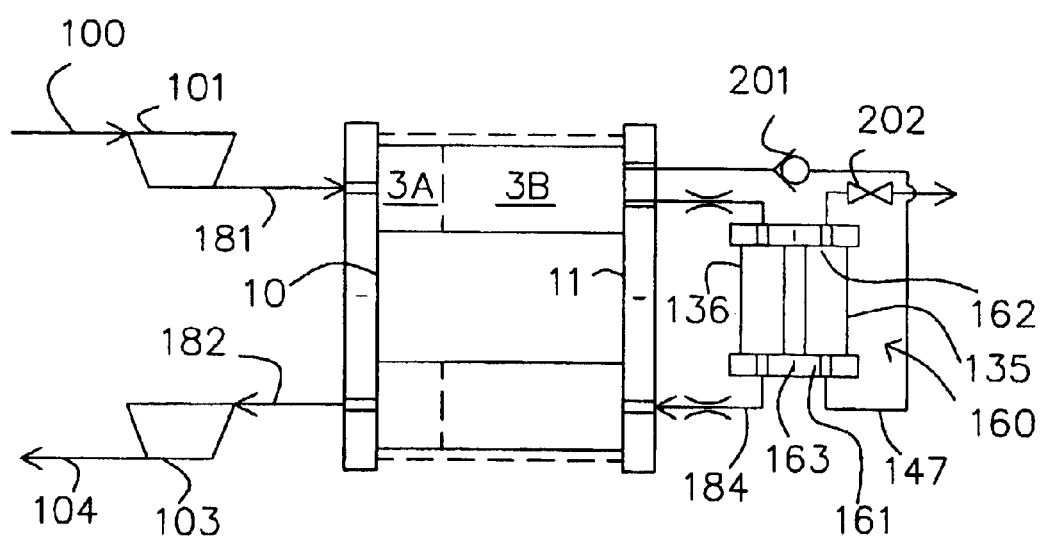

Similar to FIGS. 5A and 5B, FIG. 15 shows a guard trap 135 in product line 147 and another guard trap 136 in the light reflux loop 184. FIG. 16 also shows guard traps 135 and 136 deployed in product line 147 and light reflux loop 184, with the further feature of directional valve logic to allow periodic rotation of the desiccant beds between the light reflux lines where water may accumulate or else be returned eventually back into the product ends of the adsorbers, and into the product line where continuous regeneration by dry product takes place once initial dehumidification has taken place after startup. Further, flow mixers (not illustrated) can be included in product lines to prevent back diffusion of any water that may enter the line.

As shown in FIG. 16, an auxiliary directional valving arrangement may be used to configure guard traps between the light reflux lines and the product line, for displacement purged regeneration by the product. As an example, a plurality of guard traps (e.g. 135 and 136) are mounted within a rotary adsorption module 160 having a first rotary valve 161 and a second rotary valve 162 with rotary axis 163. Rotary adsorption module 160 may rotated continuously at very low rotary speed, or preferably may be rotated through discrete fractional rotations at discrete intervals to switch the guard traps from contaminant adsorption from each of several light reflux loops to the regeneration position when connected into the product line 147. Regeneration of a guard trap connected into product line 147 may be assisted by an auxiliary heater in that position, as contaminant displaced during regeneration will be removed by the product gas and will then not be recirculated into the product ends of the sensitive adsorber zones 3B.

The normally extremely dry and clean product gas (optionally assisted by auxiliary heaters) may also be used to regenerate any auxiliary guard traps used as (1) a contaminant sink for regenerating guard layer, or (2) isolation guard traps for breather lines when the unit is in parked mode.

The present invention has been described with reference to certain disclosed embodiments. The scope of the present invention should not be limited to those particular embodiments used as examples to illustrate the invention, but rather should be considered with respect to the following claims.

We claim:

1. A method for reducing adsorbent degradation by moisture adsorption while producing a product gas in a pressure swing adsorption process, comprising:

providing a fast cycle PSA apparatus comprising adsorbers with contaminant-sensitive adsorbents having a feed end fluidly coupled to a breather through an isolation valve, the adsorbers comprising a guard material to adsorb a contaminant in a guard layer zone and a second material in an adsorbent zone to produce a product fluid by a pressure swing, the guard layer zone being isolated on shutdown from the adsorbent zone by an isolation valve in a fluid path between the guard layer zone and the adsorbent zone;

introducing a feed gas to the feed end; and using the PSA apparatus to produce a product gas by a pressure swine adsorption process over the adsorbers after removal of contaminant from the feed gas.

2. The method according to claim 1 where the contaminant is water.

3. The method according to claim 1 where the PSA apparatus is a rotary apparatus operating at a cycle frequency of at least 30 cycles per minute.

4. The method according to claim 1 further comprising introducing to a product delivery compartment a product gas produced by pressure swing adsorption over the adsorbers.

5. A method for reducing adsorbent degradation while producing a product gas in a pressure swing adsorption process, comprising:

providing a PSA apparatus comprising a breather fluidly coupled to a feed plenum, a rotor for housing adsorbers and rotating the adsorbers to receive feed fluid from the plenum at normal process rotary speeds at least as high as 30 cycles per minute, plural adsorbers housed in the rotor and having a first end which receives feed fluid from the feed plenum and a second end positioned to deliver product gas produced by a pressure swing adsorption process to a product delivery compartment, the adsorbers comprising at least a first desiccant zone and a second adsorbent zone, seals for sealing a buffer chamber about the light product delivery compartment, the buffer chamber receiving a gas having a water vapor content the same as or less than the product gas, and a product delivery conduit for delivering a desired product gas; and using the PSA apparatus.

6. A method for shutting down a PSA apparatus according to a shutdown sequence, comprising:

operating a rotary PSA apparatus having a feed end fluidly coupled to a first end of adsorbers that include a first material for adsorbing a contaminant and at least one contaminant-sensitive adsorbent for producing a product fluid by pressure swing adsorption, the PSA apparatus further including a product end coupled to a second end of the adsorbers for delivering a product fluid;

discontinuing product fluid delivery;

exhausting feed gas;

introducing a blanket gas into a feed end of the PSA apparatus;

discontinuing delivery of fluid feed mixture to the feed end; and purging the adsorbers with a purge fluid.

7. The method according to claim 6 and further comprising preparing the apparatus for elevated pressure parking, the method comprising closing sri exhaust port and introducing a blanket gas into the feed end to pressurize the apparatus to a pressure above ambient.

8. The method according to claim 7 where the apparatus is pressurized to a park pressure of at least 0.5 bar above ambient.

9. The method according to claim 6 comprising discontinuing rotor rotation and engaging any parking seal.

10. The method according to claim 6 further comprising heating the first material to facilitate desorption of adsorbed contaminant.

11. The method according to claim 6 where the contaminant is water.

12. The method according to claim 10 and further comprising cooling the desiccant after purge.

13. The method according to claim 6 where the contaminant is water and the adsorbers are purged using a purge gas having a water vapor content substantially equal to water vapor content of the product gas produced by a PSA process over the adsorbers.

14. A method for increasing operation time before shutdown is required of a rotary fast cycle PSA apparatus, comprising:

providing a PSA unit having a feed air dryer upstream of a feed end of the PSA unit, and adsorbers having a desiccant layer at the feed end of the adsorbers, the adsorbers comprising high surface area laminated adsorbers, with the adsorbent supported in thin adsorbent sheets separated by spacers to define flow channels between adjacent sheets; and operating the PSA unit under normal operating conditions useful for producing a product fluid.

15. The method according to claim 14 where the laminated adsorbers include a desiccant layer for adsorbing water at the feed end of the sheets.

16. The method according to claim 14 where the desiccant is selected from the group consisting of alumina, alumina silicate gels, silica gels, zeolites, activated carbon, carbon molecular sieves and combinations of these materials.

17. The method according to claim 14 and further comprising providing a buffer space between the internal working zone of valves communicating to the product ends of the adsorbers, the buffer space being a positive pressured dry fluid flushed zone.

18. The method according to claim 17 where the buffer chamber has flushing circulation provided by delivered product flow.

19. The method according to claim 14 comprising placing a contaminant trap in at least one light reflux line of the PSA apparatus.

20. The method according to claim 19 where the contaminant trap adsorbs water.

21. The method according to claim 19 where activity of the contaminant trap is maintained by periodic regeneration or replacement.

22. The method according to claim 14 and further comprising placing a desiccant trap in the product line.

23. The method according to claim 14 where a target water vapor pressure at the product end is substantially that of the selected adsorbent material at the product end.

24. The method according to claim 23 where the water vapor pressure ranges from about 0.005 Pa to about 0.01 Pa at 30° C.

25. A method for producing a positive pressure park mode in a fast cycle rotary PSA apparatus, comprising:
   shutting down a rotating PSA system to reduce desiccant water loading;
   introducing a fluid into a feed end of the apparatus to provide a park pressure above ambient;
   closing all ports and discontinuing rotor rotation; and
   engaging a parking seal.

26. A method for shutting down a PSA apparatus according to a shutdown sequence, comprising:
   operating a fast cycle PSA apparatus having a feed end fluidly coupled to a first ends of adsorbers that include a guard layer and at least one contaminant-sensitive adsorbent, the PSA apparatus further including a product end coupled to a second ends of the adsorbers for delivering a product fluid;
   introducing a feed fluid to the first ends and substantially removing a contaminant fluid from the feed fluid to produce a containment-free fluid prior to the contaminant-free fluid contacting the contaminant-sensitive adsorbents;
   performing a pressure swing using the fast cycle PSA apparatus to separate a product fluid by a pressure swing adsorption process over the asdorbers by contacting the contaminant-sensitive adsorbents with the contaminant-free fluid;
   stopping delivery of product fluid;
   purging adsorbers with product flow; and
   heating the guard layer.

27. The method according to claim 26 further comprising cooling the adsorbers.

28. The method according to claim 26 where heating the guard layer comprises directly heating the guard layer using heating means.

29. The method according to claim 28 where heating means is selected from the group consisting of resistance heating, microwave heating, infra red heating, seal friction, reducing cooling load, and combinations thereof.

30. The method of claim 28 where the guard layer is heated by fluid flow.

31. The method according to claim 26 where the guard layer is heated by a heating process selected from the group consisting of compressor work, resistance heating, adsorption heating of upstream guard trap, using a heat exchanger, and combinations thereof.

32. A method for reducing degradation of a contaminant-sensitive adsorbent material due to adsorption of at least one contaminant, where the adsorbent material is used to produce at least one product fluid enriched in a first component relative to a second component from a feed fluid using an adsorption process, the feed fluid containing at least the first and second components, comprising:
   providing an adsorption apparatus comprising at least one adsorber having a feed end and a product end, and including at least one contaminant-sensitive adsorbent material used to produce the at least one product fluid the adsorber including a layer of guard material for controlling flow of at least a portion of the at least one contaminant to the at least one contaminant-sensitive adsorbent material;
   providing a flow of feed fluid comprising the at least one contaminant to the at least one adsorber, the feed fluid contacting the at least one contaminant-sensitive adsorbent material;
   controlling flow of the at least one contaminant to the at least one adsorbent material an further comprising reducing diffusion of the at least one contaminant from the guard material to the at least one contaminant-sensitive adsorbent material; and
   enriching the first component relative to the second component to produce the at least one product fluid.

33. The method according to claim 32 where the adsorption process is a pressure swing adsorption process, and the adsorption apparatus is a pressure swing adsorption apparatus.

34. The method according to claim 32 where the adsorption process is a non-conventional pressure swing adsorption process, and the adsorption apparatus is a non-conventional pressure swing adsorption apparatus.

35. The method according to claim 34 where the adsorption apparatus comprises a stator and a rotor relatively rotatable with respect to the stator, the stator and rotor mutually defining a rotary valve surface and where the adsorption process has a process cycle frequency of at least 10 cycles per minute.

36. The method according to claim 32 where the at least one contaminant comprises water.

37. The method according to claim 33 where the at least one contaminant comprises water.

38. The method according to claim 34 where the at least one contaminant comprises water.

39. The method according to claim 35 the at least one contaminant comprises water.

40. The method according to claim 32 where the feed fluid comprises a water contaminant and the at least one adsorber includes a layer or guard material positioned between the feed end of the at least one adsorber and least one water-sensitive adsorbent material, the guard material controlling the flow of at least a portion of the water contaminant to the at least one water-sensitive adsorbent material, the adsorption process is a pressure swing adsorption process, and the adsorption apparatus is a pressure swing adsorption apparatus.

41. The method according to claim 32 where the feed fluid comprises a water contaminant and the at least one adsorber includes a layer of guard material positioned between the feed end of the at least one adsorber and at least one water-sensitive adsorbent material, the guard material controlling the flow of at least a portion of the water contaminant to the at least one water-sensitive adsorbent material, the adsorption process is a non-conventional pressure swing adsorption process, and the adsorption apparatus is a non-conventional pressure swing adsorption apparatus.

42. The method according to claim 32 further comprising reducing concentration of the at least one contaminant in the guard material from a normal operational condition concentration to a lower parked condition concentration.

43. The method according to claim 32 further comprising fluidly isolating the guard material from the at least one contaminant-sensitive adsorbent material during a parked condition.

44. The method according to claim 32 where the adsorption apparatus comprises a stator and a rotor relatively rotatable with respect to the stator, the stator and rotor mutually defining a rotary valve surface and where the adsorption process has a process cycle frequency of at least 10 cycles per minute.

45. The method according to claim 32 comprising reducing overloading of the guard material with the at least one contaminant component during start-up.

46. The method according to claim 45 where the adsorption apparatus comprises a stator and a rotor relatively rotatable with respect to the stator, the stator and rotor mutually defining a rotary valve surface and where the adsorption process has a process cycle frequency of at least 10 cycles per minute.

47. The method according to claim 46 where the contaminant comprises water.

48. The method according to claim 42 comprising reducing overloading of the guard material with the at least one contaminant component during start-up.

49. The method according to claim 43 comprising reducing overloading of the guard material with the at least one contaminant component during start-up.

50. The method according to claim 32 where the adsorption apparatus further comprises at least one process containment seal fluidly connected to the at least one adsorber, and located proximal to the product end of the at least one adsorber.

51. The method according to claim 33 where the adsorption apparatus further comprises at least one process containment seal fluidly connected to the at least one adsorber, and located proximal to the product end of the at least one adsorber.

52. The method according to claim 34 where the adsorption apparatus further comprises at least one process containment seal fluidly connected to the at least one adsorber, and located proximal to the product end of the at least one adsorber.

53. The method according to claim 52 where the adsorption on apparatus comprises a stator and a rotor relatively rotatable with respect to the stator, the stator and rotor mutually defining a rotary valve surface and where the adsorption process has a process cycle frequency of at least 10 cycles per minute.

54. The method according to claim 52 where the contaminant comprises water.

55. The method according to claim 52 where the feed fluid comprises the contaminant and the at least one adsorber includes a layer of guard material positioned between the feed end of the at least one adsorber and the at least one contaminant-sensitive adsorbent material, the guard material controlling flow of at least a portion of the at least one contaminant to the at least one contaminant-sensitive adsorbent material.

56. The method according to claim 55 further comprising reducing concentration of the at least one contaminant in the guard material from a normal operational condition concentration to a parked condition concentration.

57. The method according to claim 55 further comprising fluidly isolating the guard material from the at least one contaminant-sensitive adsorbent material during a parked condition.

58. The method according to claim 55 further comprising reducing diffusion of the at least one contaminant from the guard material to the at least one contaminant-sensitive adsorbent material.

59. The method according to claim 50 where the at least one process containment seal allows at least a portion of contained process fluid to flow across the seal.

60. The method according to claim 51 where the at least one process containment seal allows at least a portion of contained process fluid to flow across the seal.

61. The method according to claim 52 where the at least one process containment seal allows at least a portion of contained process fluid to flow across the seat.

62. The method according to claim 59 where the portion of contained process fluid flowing across the seal also flows through a contaminant guard trap located downstream of the seal.

63. The method according to claim 60 where the portion of contained process fluid flowing across the seal also flows through a contaminant guard trap located downstream of the seal.

64. The method according to claim 62 where the portion of contained process fluid flowing across the seal also flows through a contaminant guard trap located downstream of the seal.

65. The method according to claim 50 where the adsorption apparatus further comprises at least one primary seal or a static seal, defining a buffer space.

66. The method according to claim 51 where the adsorption apparatus further comprises at least one primary seal or a static seal, defining a buffer space.

67. The method according to claim 52 where the adsorption apparatus further comprises at least one primary seal or a static seal, defining a buffer space.

68. The method according to claim 65 where the adsorption apparatus further comprises at least one buffer seal located inside the buffer space.

69. The method according to claim 66 where the adsorption apparatus further comprises at least one buffer seal located inside the buffer space.

70. The method according to claim 67 where tee adsorption apparatus further comprises at least one buffer seal located inside the buffer space.

71. The method according to claim 65 comprising reducing total fluid pressure within the buffer space to at least a lowest pressure of the adsorption process.

72. The method according to claim 68 comprising reducing total fluid pressure within the buffer space to at least a lowest pressure of the adsorption process.

73. The method according to claim 65 where total fluid pressure within the buffer space is reduced below atmospheric pressure.

74. The method according to claim 68 where total fluid pressure within the buffer space is reduced below atmospheric pressure.

75. The method according to claim 65 where the process containment seal has a first side and a second side, to method further comprising introducing a blanket fluid into the buffer space, the blanket fluid having a reduced concentration of to at least one contaminant on the first side of the process containment seal relative to the concentration of the at least one contaminant in the fluid on the second side of the at least one process containment seal.

76. The method according to claim 68 where the process contaminant seal has a first side and a second side, the method further comprising introducing a blanket fluid into the buffer space, the blanket fluid having a reduced concentration of the at least one contaminant on the first side relative to the concentration of the at least one contaminant in the fluid on the second side of the at least one process containment seal.

77. The method according to claim 75 where at least a portion of blanket fluid introduced to the buffer space comprises fluid originating from the product end of the at least one adsorber.

78. The method according to claim 76 where at least a portion of blanket fluid introduced to the buffer space comprises fluid originating from the product end of the at least one adsorber.

79. The method according to claim 75 where blanket fluid introduced to the buffer space comprises the product fluid.

80. The method according to claim 70 where blanket fluid introduced to the buffer space comprises the product fluid.

81. The method according to claim 75 where at least a portion of the blanket fluid introduced to the buffer space originates from a source external to the adsorption apparatus.

82. The method according to claim 76 where at least a portion of the blanket fluid introduced to the buffer space originates from a source external to the adsorption apparatus.

83. The method according to claim 81 where the blanket fluid introduced to the buffer space contacts guard material in a guard trap prior to entering the buffer space.

84. The method according to claim 82 where the blanket fluid introduced to the buffer space contacts guard material in a guard trap prior to buffer space.

85. The method according to claim 75 further comprising controlling flow rate of blanket fluid introduced into the buffer space.

86. The method according to claim 76 further comprising controlling flow rate of blanket fluid introduced into the buffer apace.

87. The method according to claim 77 further comprising controlling flow rate of blanket fluid introduced into the buffer space.

88. The method according to claim 79 further comprising controlling flow rate of blanket fluid introduced into the buffer space.

89. The method according to claim 81 further comprising controlling flow rate of blanket fluid introduced into the buffer space.

90. The method according to claim 81 where blanket fluid introduced to the buffer space contacts guard material in a guard trap after flowing out of the buffer space.

91. The method according to claim 82 where blanket fluid introduced to the buffer space contacts guard material in a guard trap after flowing out of the buffer space.

92. The method according to claim 75 including controlling a fluid flow path of the blanket fluid introduced into the buffer space.

93. The method according to claim 76 including controlling a fluid flow path of the blanket fluid introduced into the buffer space.

94. The method according to claim 77 including controlling a fluid flow path of the blanket fluid introduced into the buffer space.

95. The method according to claim 79 including controlling a fluid flow path of the blanket fluid introduced into the buffer space.

96. The method according to claim 81 including controlling a fluid flow path of the blanket fluid introduced into the buffer space.

97. The method of claim 75 where total fluid pressure of the blanket fluid introduced to the buffer space is greater than a minimum total pressure of the feed fluid or the product fluid.

98. The method of claim 76 where total fluid pressure of the blanket fluid introduced to the buffer space is greater than a minimum total pressure of the feed fluid or the product fluid.

99. The method according to claim 32 including reducing ingress of the at least one contaminant into the adsorption apparatus during a parked condition relative to a normal operating condition.

100. The method according to claim 50 including reducing ingress of the least one contaminant into the adsorption apparatus during a parked condition relative to a normal operating condition.

101. The method according to claim 98 including reducing ingress of the at least one contaminant into the adsorption apparatus during a parked condition relative to a normal operating condition.

102. The method according to claim 32, adsorption apparatus having at least two adsorbers, and wherein the method further comprises normalizing gas compositions between the at least two adsorbers during a parked condition.

103. The method according to claim 50, the adsorption apparatus having at least two adsorbers, and wherein the method further comprises normalizing gas compositions between the at least two adsorbers during a parked condition.

104. The method according to claim 101, the adsorption apparatus having at least two adsorbers, and wherein the method further comprises normalizing gas compositions between the at least two adsorbers during a parked condition.

105. The method according to claim 32, further comprising reducing ingress during startup of the at least one contaminant into a portion of the at least one adsorber having the at least one contaminant-sensitive adsorbent material.

106. The method according to claim 50, further comprising reducing ingress during startup of the at least one contaminant into a portion of the at least one adsorber having the at least one contaminant-sensitive adsorbent material.

107. The method according to claim 102, and further comprising reducing ingress during startup of the at least one contaminant into a portion of the at least one adsorber having the at least one contaminant-sensitive adsorbent material.

108. The method according to claim 32, further comprising reducing contaminant loading of the guard material during startup.

109. The method according to claim 50, and further comprising reducing contaminant loading of the guard material during startup.

110. The method according to claim 99, and further comprising reducing contaminant loading of the guard material during startup.

111. The method according to claim 105, and further comprising reducing contaminant loading of the guard material during startup.

112. The method according to claim 32 additionally comprising regenerating the at least one contaminant-sensitive adsorbent in the at least one adsorber.

113. The method according to claim 32 additionally comprising replacing at least one contaminent-sensitive adsorbent in the at least one adsorber.

114. A method for reducing degradation of a contaminant-sensitive adsorbent material due to adsorption of at least one contaminant from a source other than the feed fluid, where the adsorbent material is used to produce at least one product fluid enriched in a first component relative to a second component from a feed fluid using an adsorption process, the feed fluid containing at least the first and second components, comprising:

provinding an adsorption apparatus comprising at least one adsorber having a feed end and a product end, and including at least one contaminant-sensitive adsorbent material used to produce the at least one product fluid, the adsorption apparatus further comprising at least one process containment seal fluidly connected to the at least one adsorber;

providing a flow of feed to the at least one adsorber, the feed fluid contacting the at least one contaminant-sensitive adsorbent material;

controlling flow of the at least one contaminant to the at least one adsorbent material; and enriching the first component relative to the second component to produce the at least one product fluid.

115. The method according to claim 114 where the at least one process containment seal allows at least a portion of contained process fluid to flow across the seal.

116. The method according to claim 114 where the adsorption apparatus further comprises at least one primary seal or a static seal, defining a buffer space.

117. The method according to claim 114 including reducing ingress of the at least one contaminant into the adsorption apparatus during a parked condition relative to a normal operating condition.

118. The method according to claim 114, the adsorption apparatus having at least two adsorbers, and wherein the method further comprises normalizing gas compositions between the at least two adsorbers during a parked condition.

119. The method according to claim 114 and further comprising reducing ingress during startup of the at least one contaminant into a portion of the at least one adsorber having the at least one contaminant-sensitive adsorbent material.

120. The method according to claim 114 where the at least one adsorber includes a layer of guard material and the method further comprises reducing contaminant loading of the guard material during startup.

* * * * *